US012699847B2

(12) United States Patent

Sachdev et al.

(10) Patent No.: US 12,699,847 B2

(45) Date of Patent: Aug. 4, 2026

(54) SYSTEM AND METHOD OF SELECTING CAPABILITIES OF ARTIFICIAL INTELLIGENCE PRODUCTIVITY TOOL-ENABLABLE SOFTWARE APPLICATION VIA A MULTIMODAL INTENT HIERARCHY FOR RESPONSIVE APPLICATION TO A MULTIMODAL USER-QUERY INPUT

(71) Applicant: Dell Products LP, Round Rock, TX (US)

(72) Inventors: Mona Sachdev, Round Rock, TX (US); Ashutosh Singh, Austin, TX (US); Vinay Locharulu, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 192 days.

(21) Appl. No.: 18/788,678

(22) Filed: Jul. 30, 2024

(65) Prior Publication Data

US 2026/0037236 A1 Feb. 5, 2026

(51) Int. Cl.
| | |
|---|---|
| *G06F 40/30* | (2020.01) |
| *G06F 8/36* | (2018.01) |
| *G06F 16/334* | (2025.01) |
| *G06F 16/383* | (2019.01) |
| (Continued) | |

(52) U.S. Cl.
CPC ............... *G06F 40/30* (2020.01); *G06F 8/36* (2013.01); *G06F 16/3344* (2019.01); *G06F 16/383* (2019.01); *G06F 40/35* (2020.01); *G06V 10/811* (2022.01)

(58) Field of Classification Search
None
See application file for complete search history.

(56) References Cited

U.S. PATENT DOCUMENTS

| | | | |
|---|---|---|---|
| 8,380,714 B2 | 2/2013 | Inagaki | |
| 8,548,951 B2 | 10/2013 | Solmer | |
| 9,201,957 B2 | 12/2015 | Turdakov | |
| (Continued) | | | |

FOREIGN PATENT DOCUMENTS

WO 2020/192587 A1 10/2020

*Primary Examiner* — Douglas Godbold

(74) *Attorney, Agent, or Firm* — Prol Intellectual Property Law, PLLC; H. Kenneth Prol

(57) ABSTRACT

A system and method for matching multimodal user-query input at an information handling system includes storing capabilities associated with a plurality of AI productivity tool-enablable software applications in a hierarchical capabilities decision tree with each node including natural language textual and non-textual modality descriptions of a capability and multimodal capability intent values generated from the same. Executing code instruction to receive a multimodal user-query input in any of text, audio, or image and generate a multimodal query input intent value for matching to a best match capability for a responsive action to be taken by one of the plurality of AI productivity tool-enablable software applications executing on the information handling system via a semantic similarity search comparing the multimodal query input intent value to the multimodal capability intent values in the hierarchical capabilities decision tree based on a highest cosine semantic similarity search score.

20 Claims, 7 Drawing Sheets

(51) Int. Cl.
    *G06F 40/35*          (2020.01)
    *G06V 10/80*          (2022.01)

(56)               References Cited

U.S. PATENT DOCUMENTS

| | | | |
|---|---|---|---|
| 9,218,412 B2 | 12/2015 | Wang | |
| 9,626,358 B2 | 4/2017 | Danielyan | |
| 9,633,085 B2 | 4/2017 | Kamotsky | |
| 9,648,683 B2 | 5/2017 | Kangyo | |
| 10,146,593 B2 | 12/2018 | Gong | |
| 10,249,207 B2 * | 4/2019 | Solomon | G09B 7/04 |
| 11,392,651 B1 * | 7/2022 | McClusky | G06F 16/338 |
| 11,501,177 B2 * | 11/2022 | Wang | G06N 5/022 |
| 11,620,262 B2 | 4/2023 | Lee | |
| 11,948,073 B2 | 4/2024 | Zhang | |
| 12,292,940 B2 * | 5/2025 | Meyer | G06F 40/221 |
| 2012/0303356 A1 * | 11/2012 | Boyle | G06F 40/30 |
| | | | 707/765 |
| 2018/0075131 A1 * | 3/2018 | Van Hoof | G06F 16/2471 |
| 2018/0365065 A1 | 12/2018 | Guttman | |
| 2019/0163818 A1 * | 5/2019 | Mittal | G06F 40/30 |
| 2020/0387550 A1 | 12/2020 | Cappetta | |
| 2020/0394360 A1 | 12/2020 | Dunn | |
| 2021/0216576 A1 | 7/2021 | Staub | |
| 2021/0256207 A1 | 8/2021 | Dunn | |
| 2021/0334194 A1 | 10/2021 | Xiao | |
| 2021/0366506 A1 | 11/2021 | Han | |
| 2021/0374353 A1 | 12/2021 | Zhang | |
| 2022/0035684 A1 | 2/2022 | Gupte | |
| 2022/0035732 A1 | 2/2022 | Xiao | |
| 2022/0092439 A1 | 3/2022 | Liu | |
| 2022/0222281 A1 * | 7/2022 | Eom | G06F 16/334 |
| 2022/0318502 A1 | 10/2022 | Howell | |
| 2023/0105806 A1 | 4/2023 | Dunn | |
| 2023/0214593 A1 * | 7/2023 | Padukone | G06N 3/08 |
| | | | 704/2 |
| 2023/0222359 A1 | 7/2023 | Panikkar | |
| 2023/0237263 A1 | 7/2023 | Howell | |
| 2023/0251962 A1 | 8/2023 | Xiao | |
| 2024/0054318 A1 | 2/2024 | Feltin | |
| 2024/0061719 A1 | 2/2024 | Reddy | |
| 2024/0069770 A1 | 2/2024 | Prabhakar | |
| 2024/0069959 A1 | 2/2024 | Prabhakar | |
| 2024/0070113 A1 | 2/2024 | Prabhakar | |
| 2024/0143681 A1 * | 5/2024 | Meyer | G06Q 10/10 |
| 2024/0161003 A1 | 5/2024 | Alexander | |
| 2024/0296181 A1 * | 9/2024 | Busany | G06F 16/367 |
| 2024/0362279 A1 * | 10/2024 | Kharbanda | G06F 16/9532 |
| 2026/0029999 A1 * | 1/2026 | Bieck | G06F 8/36 |

* cited by examiner

SYSTEM AND METHOD OF SELECTING CAPABILITIES OF ARTIFICIAL INTELLIGENCE PRODUCTIVITY TOOL-ENABLABLE SOFTWARE APPLICATION VIA A MULTIMODAL INTENT HIERARCHY FOR RESPONSIVE APPLICATION TO A MULTIMODAL USER-QUERY INPUT

FIELD OF THE DISCLOSURE

The present disclosure generally relates to execution of computer readable code instructions of artificial intelligence (AI) productivity tools with an information handling system. The present disclosure more specifically relates systems and methods of identifying an artificial intelligence productivity tool-enablable software application capability that is a best match for an action requested by a user within a received multimodal user-query input that may include speech, text, and/or images for a similarity search across a plurality of such capabilities having hierarchical relationships to one another.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more software applications such as workspace productivity applications, or gaming applications or the like. Further, the information handling system may include AI productivity tools that interface with various AI productivity tool-enablable software applications such as natural language chat-enabled environments for interface with services of software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
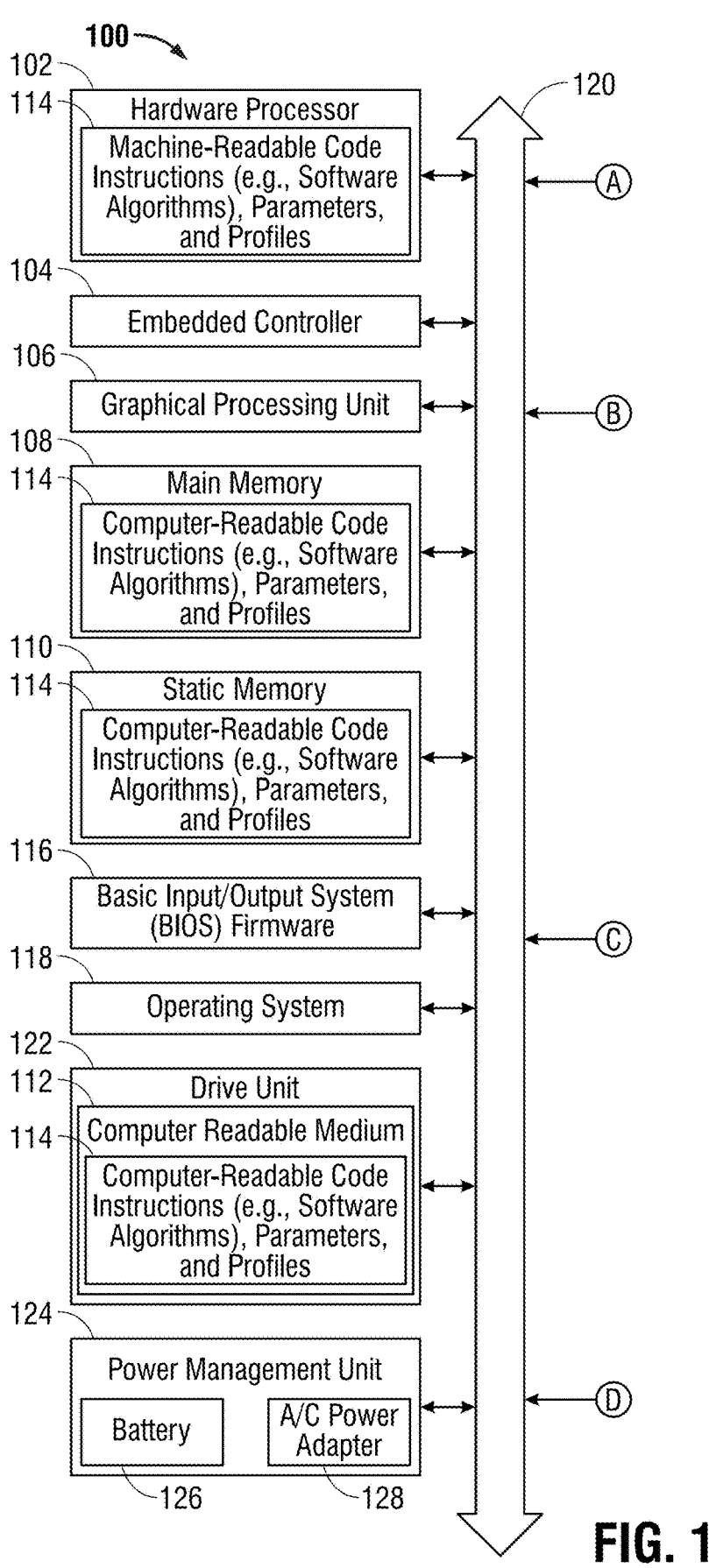
FIG. 1 is a block diagram illustrating an information handling system that includes an on the box (OTB) artificial intelligence (AI) productivity tool software application to select among a plurality of AI productivity tool-enablable software application capabilities for services, operations, or other responses that are responsive to a multimodal user-query input according to an embodiment of the present disclosure.
Figure 1:
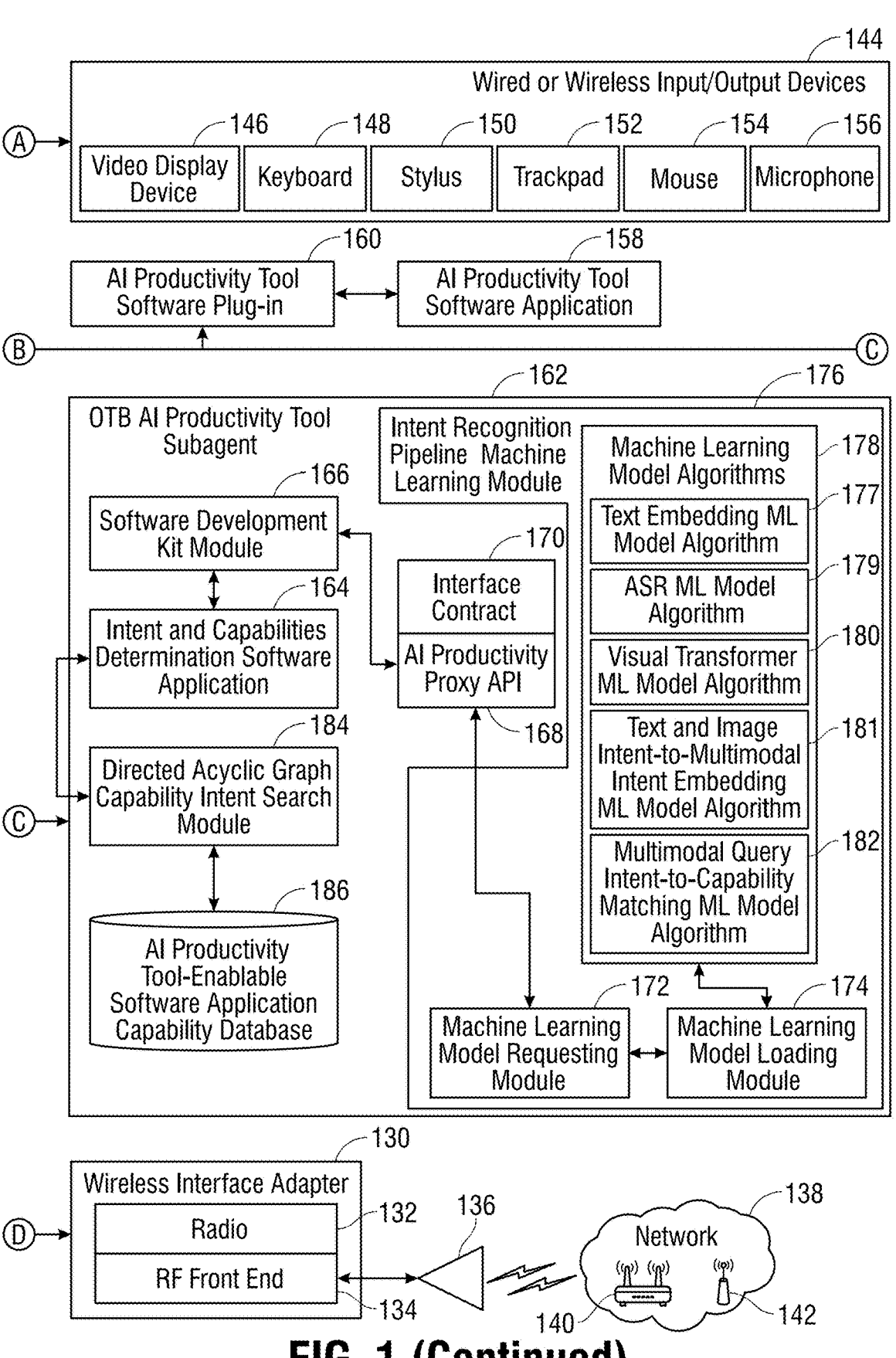
Figure 1:
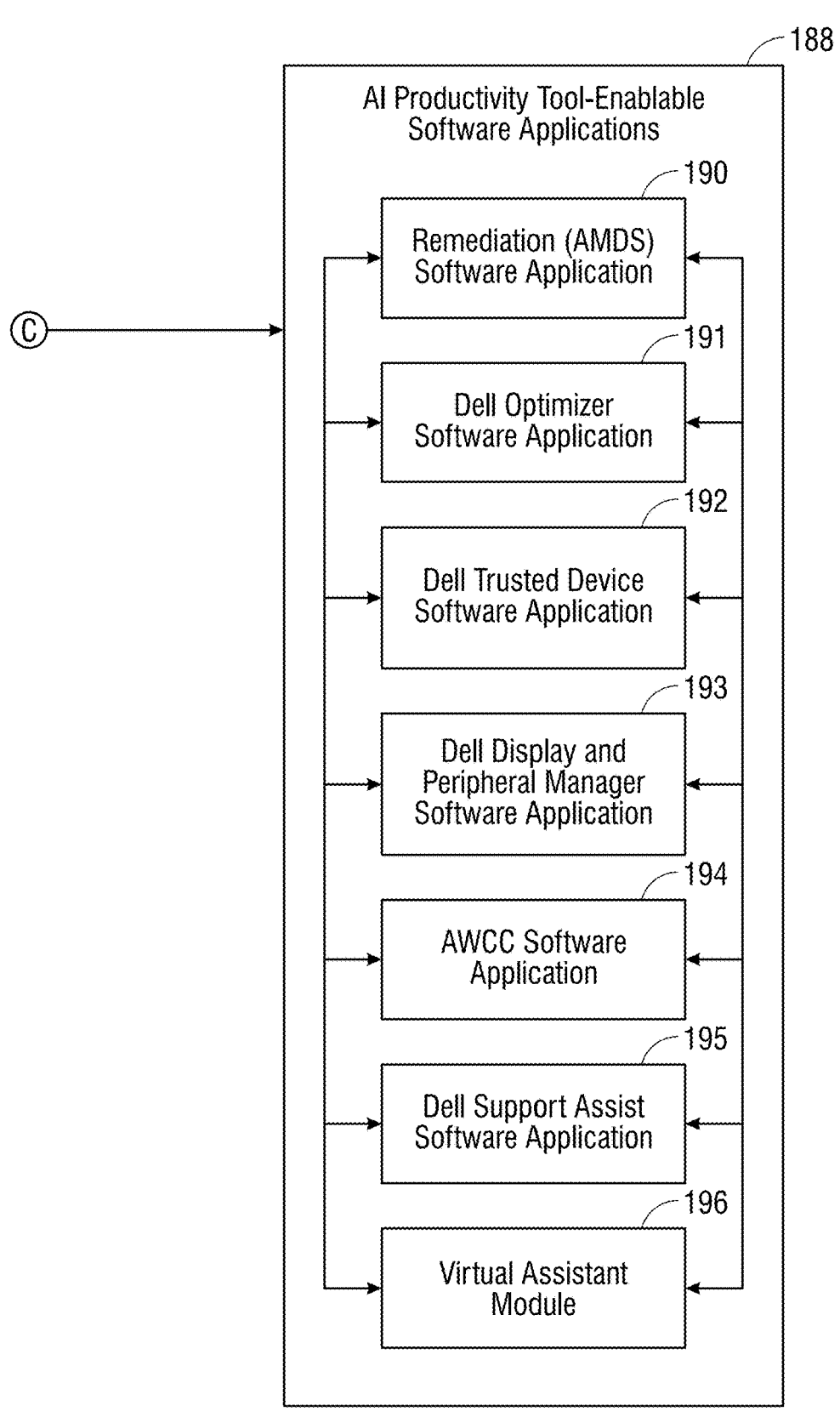

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text input from a user and implements a number of actions or utilizes services of various software applications based on the natural language of the input. In some information handling systems of embodiments of the present disclosure, the OTB AI productivity tool may interface with various AI productivity tool-enablable software applications being executed or executable on the information handling system. These AI productivity tool-enablable software applications may integrate with the OTB AI productivity tool to allow user queries to trigger certain actions declared, supported, and managed by these AI productivity tool-enablable software applications. However, multimodal interfaces may receive text, video, audio, and image inputs to trigger processes to select among the plurality of capabilities offered by and associated with each of a plurality of AI productivity tool-enablable software applications, but this may create mapping challenges. The direct mapping or matching of multimodal user-query inputs with all available capabilities results in inefficient time complexity and employs computationally demanding AI model algorithms for each capability. Thus, hierarchical levels within a capabilities decision tree and placing the capabilities as capability nodes in a hierarchical capabilities decision tree is done to facilitate the search of multimodal capability intent values to identify a response capability to execute a capability intent action being requested in embodiments herein.

The present specification describes a hardware processor executing code instructions of an OTB AI productivity tool in embodiments herein that may match received multimodal user-query input to known capabilities of one or more of the AI productivity tool-enablable software applications through execution by a hardware processor of machine-readable program code instructions of an intent and capabilities determination software application. This execution of the machine-readable program code instructions of the intent and capabilities determination software application generates multimodal capability intent values from natural language textual and non-textual modality descriptions of capabilities associated with each of a plurality of AI productivity tool-enablable software applications. In an embodiment, each of the capabilities including a plurality of natural language phrases and non-textual attributes grouped with multimodal capability intent values from are grouped together according to logical topics in parent child relationships, such as with a directed acyclic graph (DAG), within branches of a capabilities decision tree stored in an AI productivity tool-enablable software application database. Metadata for each capability node with the natural language textual and non-textual node descriptions of that capability also identifies any child capability nodes and any parent capability nodes to that capability node within the capabilities decision tree. In an embodiment, the execution of the machine-readable program code instructions of the intent and capabilities determination software application to generate multimodal capability intent values from the natural language textual and non-textual modality descriptions of the capabilities associated with each of a plurality of AI productivity tool-enablable software applications. Still further, the hardware processor may execute machine-readable program code instructions of the intent and capabilities determination software application to generate a multimodal query input intent value for a multimodal user-query input received via text, audio, or image requesting an action to be taken by one of the plurality of AI productivity tool-enablable software applications executing on the information handling system.

The hardware processor may also execute machine-readable program code instructions of the intent and capabilities determination software application to perform a semantic score similarity search comparing the multimodal capability intent values to the multimodal query input intent value to identify a best match capability for the received user-query input having a multimodal capability intent value that generates a highest semantic search score. In order to fulfill the user's multimodal query input, the hardware processor may also execute machine-readable program code instructions for instructing a first of the plurality of AI productivity tool-enablable software applications having the best match capability to execute the best match capability in response to the multimodal user-query input. This process allows a user to provide a multimodal user-query input in the form of audio, images, and/or text at an AI productivity tool software application such as a chatbot and have services, operations, or responses to that multimodal user-query input be performed. The customization and use-case-specific organization of capabilities in the DAG-type decision tree accounts for all of these types of input modalities (e.g., text, audio, video, images) and enables a more efficient tree-traversal search algorithm for a matching capability thereby improving the ability of a user to have the user's query input efficiently addressed. With the ability to receive multimodal user-query inputs form the user, the systems and methods described herein provide for a more comprehensive representation for these multimodal user-query inputs thereby increasing the available way for a user to provide user-query inputs to the information handling system while reducing also resource consumption (e.g., processing resource) in determining a matching capability response to the multimodal user-query input and associated with the AI productivity tool-enablable software applications.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify capability intent actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU), an accelerated processing unit (APU), other types of hardware processing devices, or any combination thereof. It is appreciated that the information handling system 100 may include any number of hardware processing devices described herein. Computer readable code instructions stored in main memory 108 (e.g., RAM) may be "hot" or quickly accessible by hardware processing resources using that main memory 108. Machine-readable program code instructions stored in static memory 110, main memory 108, or drive unit 122 may be "cold" and latency may be involved in invoking such machine-readable program code instructions to main memory 108 according to embodiments herein. Additional components of the information handling system 100 may include one or more storage devices such as static memory 110 or drive unit 122. The information handling system 100 may include or interface with one or more communications ports for communicating with external devices, as well as various input and output (I/O) devices 144, such as a mouse 154, a trackpad 152, a stylus 150, a keyboard 148, a video/graphics display device 146, a microphone 192, or any combination thereof. Portions of an information handling system 100 may themselves be considered information handling systems 100.

Information handling system 100 may include devices or modules that embody one or more of the devices or execute instructions for one or more systems and modules. The information handling system 100 may execute machine-readable program code instructions (e.g., software algorithms), parameters, and profiles 114 that may operate on servers or systems, remote data centers, or on-box in individual client information handling systems according to various embodiments herein. In some embodiments, it is understood any or all portions of machine-readable program code instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile (read-only memory, flash memory etc.) or any combination thereof or other memory with computer readable medium 112 storing instructions (e.g., software algorithms), parameters, and profiles 114 executable by the hardware processor 102 (e.g., central processing unit), NPU, APU, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, GPU 106, NPU, APU, and/or others may execute one or more bus drivers in order to transmit this data between the information handling system 100 and the input/output devices 144 described herein. In an embodiment, the information handling system 100 may be in wired or wireless communication with the I/O devices 144 such a keyboard 148, a mouse 154, video display device 146, stylus 150, trackpad 152, microphone 192, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 or other hardware devices that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, a hardware processing resource executes machine-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing machine-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a machine-readable medium that includes machine-readable program code instructions, parameters, and profiles 114 or receives and executes machine-readable program code instructions, parameters, and profiles 114 responsive to a propagated signal, so that a hardware device connected to a network 138 may communicate voice, video, or data over the network 138. Further, the machine-readable program code instructions, parameters, and profiles 114 may be transmitted or received over the network 138 via the network interface device or wireless interface adapter 130.

The information handling system 100 may include a set of machine-readable program code instructions, parameters, and profiles 114 that may be executed to cause the computer system to perform any one or more of the methods or computer-based functions disclosed herein. For example, machine-readable program code instructions, parameters, and profiles 114 may be executed by a hardware processor 102, GPU 106, EC 104 or any other hardware processing resource and may include software agents, or other aspects or components used to execute the methods and systems described herein. Various software modules comprising application machine-readable program code instructions, parameters, and profiles 114 may be coordinated by an OS 118, and/or via an application programming interface (API). An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable program code instructions, parameters, and profiles 114 in which one or more sets of machine-readable program code instructions, parameters, and profiles 114 such as firmware or software can be embedded to be executed by the hardware processor 102 (e.g., CPU) or other hardware processing devices such as a GPU 106, an EC 104, an NPU, an APU, or other hardware processing resource device to perform the processes described herein. Similarly, main memory 108 and static memory 110 may also contain a machine-readable medium for storage of one or more sets of machine-readable program code instructions, parameters, or profiles 114 described herein. The disk drive unit 122 or static memory 110 also contain space for data storage. Further, the machine-readable program code instructions, parameters, and profiles 114 may embody one or more of the methods as described herein. In a particular embodiment, the machine-readable program code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain machine-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain machine-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the machine-readable medium is shown to be a single medium, the term "machine-readable medium" includes a single medium or multiple media, such as a centralized or distributed database, and/or associated caches and servers that store one or more sets of machine-readable code instructions. The term "machine-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the machine-readable medium can include a solid-state memory such as a memory card or other package that houses one or more non-volatile read-only memories. Further, the machine-readable medium can be a random-access memory or other volatile re-writable memory. Additionally, the machine-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a machine-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described in embodiments herein, the information handling system 100 includes the hardware processor 102 executing machine-readable code instructions of artificial intelligence (AI) productivity tool software application 158 and an on-the-box (OTB) AI productivity tool subagent 162 that, in an embodiment, may be used by a user to perform one or more similarity search methods to match a received multimodal user-query input and a correlating a multimodal query input intent value with a multimodal capability intent value generated for a capability associated with an AI productivity tool-enablable software application 188 in order to identify the capability for the AI productivity tool-enablable software application 188 that can address the user request within the multimodal user-query input.

In an embodiment, the AI productivity tool software application may receive multimodal user-query input that includes text input, audio input, video input, and/or image input. In an example embodiment, text input may be received via a chatbot-type AI productivity tool software application 158. In another example embodiment, the AI productivity tool software application 158 may receive video and/or image input from the user that may include image data with non-textual attributes as well as text in the form of natural language phrases that describe some or all of the multimodal user-query input. In this example embodiment, the user may provide a screen shot or other image to the AI productivity tool software application 158 that includes a message regarding a battery 126 of the information handling system 100 and indicating a status or error code of the battery 126. The AI productivity tool software application 158 may receive this image input as well as an audio or text input in embodiments herein. Plural types of input may be received including text, images, videos and audio (e.g., at a microphone 156) such that these other types of multimodal user-query input can be received in addition to image input at the OTB AI productivity tool subagent 162 from the AI productivity tool software application 158 via an AI productivity tool software plugin 160. It is appreciated that the AI productivity tool software application 158 may be any software application that can receive this multimodal user-query input and may include a proprietary AI productivity tool software applications 158 or third-party AI productivity tool software application 158.

The OTB AI productivity tool subagent 162 may facilitate the matching or correlation of a generated multimodal query intent from the multimodal user-query input to a capability having a multimodal capability intent value associated with one or more AI productivity tool software applications 158. In an example embodiment, the OTB AI productivity tool subagent 162 may include machine-readable program code instructions of an intent and capabilities determination software application 164. The execution of the machine-readable program code instructions of the intent and capabilities determination software application 164 by the hardware processor 102 or other hardware processing resource (e.g., EC 104, GPU 106, neural processing unit (NPU), an accelerated processing unit (APU), and the like) causes the multimodal user-query input to be received and a multimodal query intent value generated for that multimodal user-query input. Additionally, the execution of the machine-readable program code instructions of the intent and capabilities determination software application 164 directs that any capabilities associated with any AI productivity tool software application 158 to be identified and a multimodal capability intent value be generated from any natural language description or images describing the capability. The execution of the machine-readable program code instructions of the intent and capabilities determination software application 164 causes semantic similarity comparison of the multimodal query intent value to a plurality of the multimodal capability intent values in order to identify a capability associated with an AI productivity tool software application 158 that can provide the services, operations, or responses that respond to a multimodal user-query input provided by the user.

In an embodiment, the execution of the machine-readable program code instructions of the intent and capabilities determination software application 164 directs that a directed acyclic graph (DAG) capability intent search module 184 conduct a tree-traversal algorithm to search an organized hierarchical capabilities decision tree of available capabilities associated with each of the intent and capabilities determination software applications 164. In an example embodiment this hierarchical capabilities decision tree may include a plurality of parent capability nodes that may include one or more child nodes within the hierarchical organization of the hierarchical capabilities decision tree. In some embodiments herein, each of these first level parent capability nodes within the hierarchical capabilities decision tree form a branch of the hierarchical capabilities decision tree. Each capability node in the hierarchical capabilities decision tree may include metadata of either or both of the natural language textual and non-textual modality descriptions of capabilities associated with each capability of the AI productivity tool software applications 158 depending on descriptions available.

In an embodiment, the process of gathering or otherwise identifying the capabilities associated with each of the AI productivity tool software applications 158 may include, either in real-time or prior to execution of the OTB AI productivity tool subagent 162, describing in natural language textual and/or non-textual modality descriptions of each of the AI productivity tool-enablable software applications that may be used when interfacing with the OTB AI productivity tool subagent 162. In embodiments herein, the natural language textual and/or non-textual modality descriptions of capabilities associated with the AI productivity tool software applications 158 may be stored in the AI productivity tool-enablable software application capability database 186 within the determined hierarchical capabilities decision tree.

As mentioned, these capabilities may be organized into a hierarchical capability decision tree such as a directed acyclic graph (DAG) decision tree that may later be searched via execution of machine-readable program code instructions of a DAG capability intent search module 184. The relationship of each capability to each other within the hierarchical capabilities decision tree may also be stored at the AI productivity tool-enablable software application capability database 186 with the capabilities being mapped in capability nodes using logical parent-child relationships between and among the plurality of natural language textual and non-textual modality descriptions of the capabilities. Each capability node of this hierarchical capabilities decision tree may include a capability name, capability identification (ID) (e.g., in alphanumeric values), and a natural language textual and non-textual modality descriptions of the capability, among other attributes. In some embodiments, each capability node may further include a multimodal capability intent value, or one or more keywords within the capability natural language textual and non-textual modality descriptions. In the context of the present specification, the organization of these capabilities is based on both the textual and non-textual attributes of the text, audio, video, and image attributes of the capabilities. For example, capabilities associated with Dell® Support Assist® software application 195 may include capabilities that monitor power levels and health status of the battery 126. The capabilities associated with this AI productivity tool software application 158 may therefore have non-textual attributes that include potential images that show screenshots of an error message or other notification from the Dell® Support Assist® software application 195. In one example embodiment, non-textual attributes may include aspects of an image related to the health or power levels of the battery 126 of the information handling system 100. The execution of the machine-readable program code instructions of the intent and capabilities determination software application 164 and ML model algorithms herein allow for non-textual attributes to be identified (e.g., visual features within the image or video) and assigned a capability intent value to that capability if available in some embodiments although some capabilities may also have natural language text descriptions or just a natural language description.

As described in more detail herein, the hardware processor 102 or other hardware processing device may execute machine-readable code instructions for one or more text embedding ML model algorithms (e.g., 181) in an embodiment for a capability that has a natural language text description to generate a portion of multi-dimensional vector multimodal capability intent value with a text capability intent value for a text description of that identified capability. In further embodiments, a visual transformer embedding ML model algorithm 180 may generate an image capability intent value based on the visual features of an image depicting an error message related to the operations of the battery and which is associated with that capability of the Dell® Support Assist® software application 195. Execution of machine-readable program code instructions for a text and image intent-to-multimodal intent ML model algorithm 181 may operate to generate a multi-dimensional vector multimodal capability intent value for text and image intents of that identified capability from execution of a combining algorithm to combine the text capability intent value and the non-textual image capability intent value according to various embodiments herein.

The hierarchical capabilities decision tree is searchable via the execution of the DAG intent capability intent search module 184, in an embodiment. The hierarchical capabilities decision tree may arrange capability nodes in branches that may also identify child capability nodes with natural language textual and non-textual modality capability descriptions therewithin as providing greater specificity than its identified parent capability node with natural language textual and non-textual modality descriptions. For example, a parent capability node with natural language textual and non-textual modality descriptions phrase such as "passwords" may have two child capability nodes with natural language textual and non-textual modality descriptions, including "Microsoft password," and "Outlook password," each providing a more specific example of the parent phrase "password." In an embodiment, any parent capability node with natural language textual and non-textual modality descriptions may be separated from children capability nodes with natural language textual and non-textual modality descriptions within the hierarchical capability decision tree by branches. Each level of the hierarchical capability decision tree may thus include one or more capability nodes identified as a child and connected via a branch to one of the capability nodes in the previous level of the hierarchical capability decision tree. Each capability node with natural language textual and non-textual modality descriptions identified as a child in such a way within the hierarchical capability decision tree may include an identification of its parent capability node or parent capability natural language textual and non-textual modality descriptions. It is contemplated that any capability node may include a natural language textual description a non-textual description modality or both in various embodiments herein.

In an embodiment, execution of the intent and capabilities determination software application 164 using a text and image intent-to-multimodal intent embedding ML model algorithm 181 may determine multimodal capability intent values associated with natural language textual and non-textual modality descriptions of the gathered capabilities for each of a plurality of AI productivity tool-enablable software applications. In example embodiments, the textual and non-textual (e.g., text and image) capability intent values may be embedded separately by generating a vector capability intent value for text of that identified capability with one or more textual embedding ML model algorithms 177 to generate a textual capability intent value while, for example, a convolutional neural network, visual transformers (e.g., visual transformer ML model algorithm 180), bag of visual words, a bidirectional encoder representations from transformers (BERT) language model, a BERT-like transformer, and/or a vision transformer (ViT) encoder model may be used to generate a non-textual vector intent value for an image. In an embodiment, the generated vector capability intent values for each of the text and image may be combined to create the multi-dimensional vector capability intent value. In an embodiment, the generated vector capability intent values generated from the text and image may be averaged together, added together, multiplied together, concatenated, or subjected to a dot product process (e.g., a Euclidean magnitude of the two vectors and the cosine of the angle between them), and the like to obtain the multi-dimensional multimodal vector capability intent value. These multimodal capability intent values are a mathematical representation of descriptors of the capability operations or services from various AI productivity tool-enablable software applications and may be represented by a mathematical value that is an embedded multimodal capability intent value in a multi-axis vector space that may be associated with a natural language textual and non-textual modality descriptions for that capability or intent.

In an embodiment, the hardware processor 102 may execute machine-readable code instructions of the intent and capabilities determination software application 164 using a multimodal query intent-to-capability matching ML model algorithm 182 to perform a cosine similarity search or comparison that compares a vectorized multimodal user-query input intent value and vectorized multimodal capability intent values to determine the contextual similarity between the natural language textual and non-textual modality descriptions of the capability and the multimodal user-query input (e.g., which may include both textual, audio, video, and images). This may be performed for several of the capability intent values within the capabilities decision tree to identify a multimodal capability intent value of childless end-of-branch capability nodes that most closely matches or correlates with the multimodal user-query input. In embodiments herein, the childless end-of-branch capability nodes include a parent contextual weighted multimodal capability intent value for semantic similarity comparisons as described in embodiments herein. In such a way, the hardware processor 102 executing machine-readable program code instructions for the intent and capabilities determination software application 164 may take relevance and context of natural language text and non-textual attributes of, for example, an image and/or text or speech within a multimodal user-query input into account when determining a matching or correlating capability of an AI productivity tool-enablable software application 188 that is most likely to address the user's intent within the multimodal user-query input.

In another embodiment, in order to overcome the risk of data saturation, the hardware processor 102 executing machine-readable code instructions for a multimodal query intent-to-capability matching ML model algorithm 182, searching a hierarchical capabilities decision tree via DAG capability intent search module 184 may limit the number of comparisons made against the multimodal query input intent value based on hierarchical relationships of capabilities in the hierarchical capabilities decision tree. These hierarchical relationships are identified within metadata and illustrated by the positions of the natural language textual and non-textual modality descriptions of the capabilities, or phrases therewithin, as given in the branches of the hierarchical capabilities decision tree stored at the AI productivity tool-enablable software application capability database 186. For example, the hardware processor 102 executing machine-readable code instructions of the DAG capability intent search module 184 performs a tree-traversal algorithm that may determine, for each capability at a first level of the hierarchical capabilities decision tree, a cosine semantic similarity search score that compares the vectorized multimodal user-query input intent value and the multimodal capability intent values for the natural language textual and non-textual modality descriptions of the capability nodes at the first level. The hardware processor 102 executing machine-readable code instructions of the DAG capability intent search module 184 of the OTB AI productivity tool subagent 162 may then determine a parent best match capability having a highest cosine semantic similarity search score among the capability nodes at the first level of the hierarchical capabilities decision tree and proceed to search down the branch under that parent capability node until one or more childless end-of-branch capability nodes are selected to determine a matching capability.

Instead of performing this determination for each node of the second level of the hierarchical capabilities decision tree, the hardware processor 102 executing machine-readable code instructions for the DAG capability intent search module 184 and multimodal query intent-to-capability matching ML model algorithm 182 (e.g., depending on the multimodalities of the user-query input) may determine a cosine semantic similarity search score only for the children in the branch of the capability natural language textual and non-textual modality descriptions identified as the parent best match capability node for the previous level of the hierarchical capabilities decision tree. Comparison of cosine semantic similarity search scores, as performed via execution of machine-readable code instructions of the multimodal query intent-to-capability matching ML model algorithm 182 by the hardware processor 102 in an embodiment, may be limited at each level of the hierarchical capabilities decision tree to children of the natural language description of the capability at the previous level having a capability intent value generating a highest parent cosine semantic similarity search score along splits in the branch until one or more childless end-of-branch capability nodes are selected to determine a matching capability. In some embodiments, the cosine semantic similarity search score for each child capability node may be weighted by the cosine semantic similarity search score for its parent down to the childless end-of-branch capability nodes are selected among to determine a matching capability. In such a way, the hardware processor 102 executing machine-readable code instructions of the DAG capability intent search module 184 and multimodal query intent-to-capability matching ML model algorithm 182 may consistently narrow focus of comparisons between the multimodal query input intent value and the plurality of multimodal capability intent values for natural language textual and non-textual modality descriptions of increasing specificity. The natural language capability of one or more childless end-of-branch capability nodes for an AI productivity tool-enablable software application 188 having the highest parent-score weighted cosine semantic similarity search score may then be identified, via execution of machine-readable code instructions of the OTB AI productivity tool subagent 162 by the hardware processor 102 as the capability most likely to address the user's intended request within the multimodal user-query input. In such a way, the hardware processor 102 executing code instructions for the DAG capability intent search module 184 and multimodal query intent-to-capability matching ML model algorithm 182 may overcome or lessen the impacts of data saturation encountered by comparing the multimodal query input intent value to all multimodal capability intent values, and may thus decrease consumption of processing resources.

In an embodiment, ML model algorithms (e.g., 179, 180, 181, 182) of the machine learning model algorithms 178 within the intent recognition pipeline machine learning module 176 may be used to generate a multimodal query intent value associated with each multimodal user-query input received at the AI productivity tool software application 158, and match the multimodal user-query input to a capability in the hierarchical capabilities decision tree as described above. For example, an automatic speech recognition (ASR) ML model algorithm 179, a text embedding ML model algorithm 177, visual transformer embedding ML model algorithm 180, and/or a similarity search ML model algorithm such as the multimodal query intent to capability matching ML model algorithm 182, and others work in various combinations with one another may be used to detect a user's audio speech input, conversion to text or detecting text, and generate a textual query intent vector value from the text of the user-query input and/or a non-textual query intent vector value from image or other inputs of a user query input. The textual or non-textual user-query input is received from the AI productivity tool software application 158 or other interface such as one specific to an AI productivity tool-enablable software application 188. Thus, a user may provide both text input and image input as the multimodal user-query input at the AI productivity tool software application 158 and the intent and capabilities determination software application 164 may cause that the text embedding ML model algorithm 177, the ASR ML model algorithm 179, the visual transformer ML model algorithm 180, text and image intent-to-multimodal intent embedding ML model algorithm 181, and the multimodal query intent-to-capability matching ML model algorithm 182 be executed in order to determine the multimodal query intent value of the user-query input as described herein.

In an example embodiment, the intent and capabilities determination software application 164 may call a software development kit (SDK) module 166. The SDK module 166 may include any machine-readable program code instructions that is executed by the hardware processor 102 or other hardware processing resource to request that an ML model algorithm 178 be invoked to generate, in an embodiment, a multimodal intent value based on received multimodal user-query input from a user. For example, the ML model algorithm 178 may include the visual transformer ML model algorithm 180 to generate an image query intent value, if any images are included in the multimodal user-query input. As described herein, the user may provide an image to the AI productivity tool software application 158 that may include a notification or error message. This image may be obtained via the user capturing a screen shot, the user uploading a specific notification, or other processes of submitting an image to the AI productivity tool software application 158. The visual transformer ML model algorithm 180 may be used to identify visual features within the image user-query input and generate the multimodal intent value. In another example, the ML model algorithms 178 may include the ASR ML model algorithm 179 to generate a text query intent value if any audio is included in the multimodal intent value. The audio ASR ML model algorithm 179 may recognize the speech in the audio and transfer it into text to generate text query intent value. In another example, the ML model algorithms 178 may include a text and image intent-to-multimodal intent embedding ML model algorithm 181 to generate a text query intent value from text provide by the user at the AI productivity tool software application 158 by the user typing into an interface associated with the AI productivity tool software application 158. In yet another example, the ML model algorithms 178 may include the text and image intent-to-multimodal intent embedding ML model algorithm 181 to generate a multimodal intent value from multimodal user-query input that includes both images and text.

In an embodiment, each of the ASR ML model algorithm 179, the visual transformer ML model algorithm 180, and the text and image intent-to-multimodal intent embedding ML model algorithm 181, receives the multimodal user-query input, identifies the type of mode or modes the multimodal user-query input is in, and with an embedding algorithm generates a vectorized multimodal query intent value for the multimodal user-query input. The ML model algorithm 178 may also include the multimodal query intent-to-capability matching ML model algorithm 182 that receives the assigned vectorized multimodal query intent value as input and matches the vectorized multimodal query intent value to a vectorized multimodal capability intent value associated with the AI productivity tool-enablable software application 188 from the hierarchical capabilities decision tree that can serve as the capability intent action responsive to the multimodal user-query input as described in embodiments herein.

It is appreciated that the selected ML model algorithms 178 used in various phases may satisfy an interface contract 170 requested by the intent and capabilities determination software application 164 such that their execution generates the multimodal query intent value from the multimodal user-query input that may then be matched with an available capability associated with one of the plurality of AI productivity tool-enablable software applications 188 as the capability intent action responsive to the multimodal user-query input from the user. The interface contract 170 described herein defines the requirements that selected ML model algorithms 178 are to have in order to be able receive a specific type of input (e.g., text, audio, video, images) from the intent and capabilities determination software application 164 or any AI productivity tool-enablable software application 188 and to provide a specific type of output to the intent and capabilities determination software application 164. In an embodiment, the interface contract 170 is generated by an AI productivity proxy API 168 invoked by the SDK module 166 in order to identify the specific ML model algorithm 178 that provides the appropriate output to the intent and capabilities determination software application 164 for each phase. The execution of the machine-readable program code of the intent and capabilities determination software application 164 allows a user to interface with the AI productivity tool software application 158 (e.g., via text, audio, images, etc.) and have a responsive action, such as a hardware operation, software service, or other response from the information handling system 100 that satisfies the user's query input.

The systems and methods described herein allow a user to provide a multimodal user-query input in the form of audio, images, video, and/or text at an AI productivity tool software application, such as a chatbot, and have software services, hardware or software operations, or responses to that multimodal user-query input be performed by a matching capability of an AI productivity tool-enablable software application 188 for executing a responsive capability intent action. The customization and use-case-specific organization of capabilities in nodes of a hierarchical capabilities decision tree with multimodal intent values accounts for all of these types of input modalities (e.g., text, audio, video, images) increasing the ability of a user to have the user's input addressed. With the ability to receive multimodal user-query inputs form the user, the systems and methods described herein provide for a more comprehensive options of the multimodal user-query inputs for a user thereby increasing the efficiency of the information handling system while reducing resource consumption (e.g., processing resource) in matching capabilities associated with the AI productivity tool-enablable software applications 188 responsive to the multimodal user-query input.

In the present specification, when referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
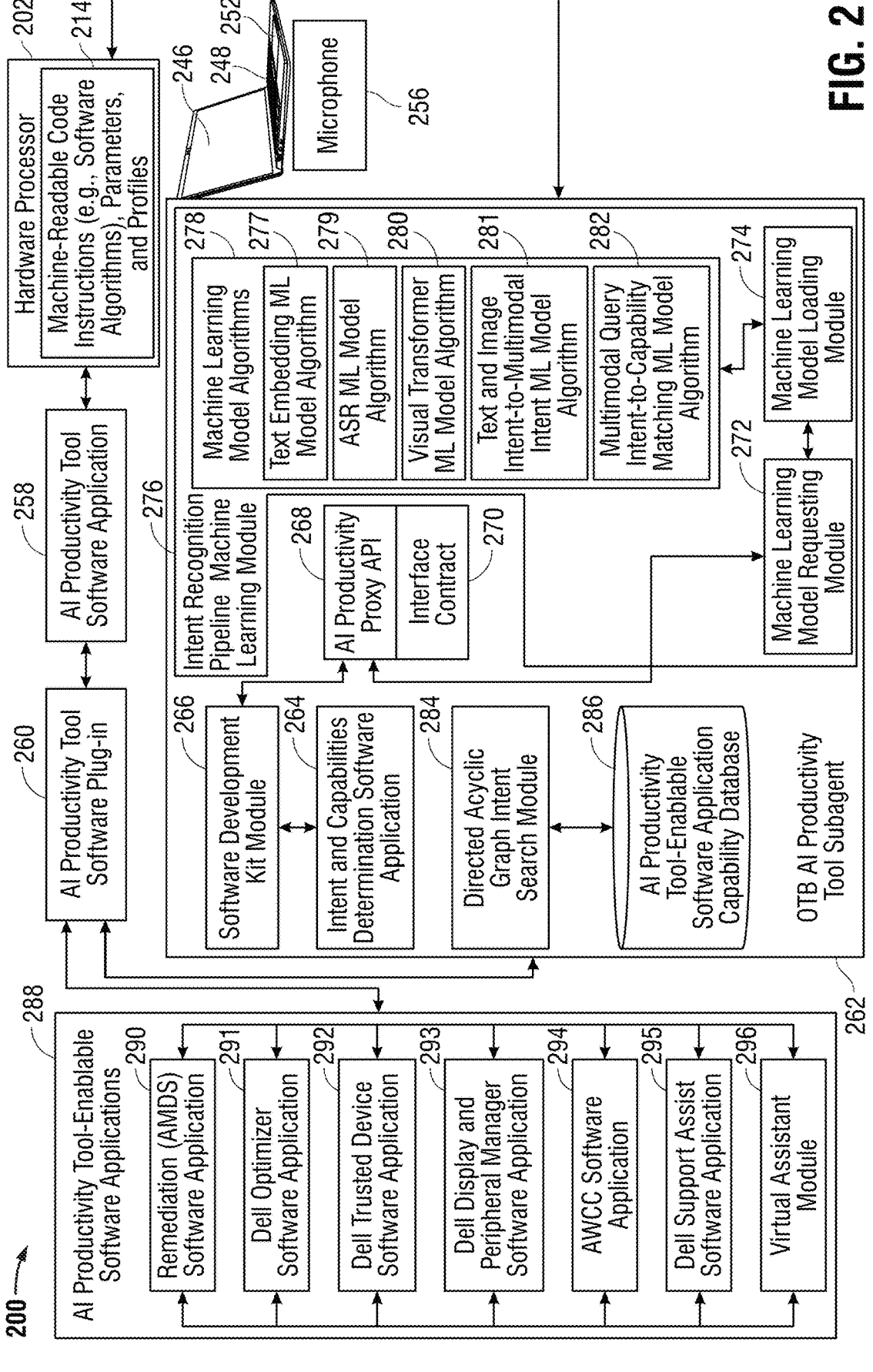
FIG. 2 is a graphic and block diagram illustrating an information handling system that includes machine-readable program code instructions an AI productivity tool subagent and software modules to select among a plurality of AI productivity tool-enablable software applications for software services, operations, or responses that are responsive to a multimodal user-query input according to another embodiment of the present disclosure.

FIG. 2 is a graphic and block diagram illustrating an information handling system 200 that includes machine-readable program code instructions an AI productivity tool subagent 262 to select among a plurality of AI productivity tool-enablable software applications 288 for software services, hardware and software operations, or responses to a multimodal user-query input according to another embodiment of the present disclosure. The information handling system 200 may, in an embodiment, include a laptop-type information handling system 200. This information handling system 200 may include a video display device 246 to provide output to a user and one or more input/output devices such as a keyboard 248, a trackpad 252, and a microphone 256 for the user to provide input to the information handling system 200. Again, the information handling system 200 may include a hardware processor 202 with machine-readable program code instructions 214 to execute the machine-readable program code instructions associated with the modules, ML model algorithms, and AI productivity tool-enablable software applications 288, and other firmware/software described herein.

As described herein, the user may interface with an AI productivity tool software application 258 to receive multimodal user-query input at the information handling system 200. For example, a user may be operating the information handling system 200 and realize that a notification has been presented on the video display device 246 indicating to a user that a warranty associated with one or more hardware components of the information handling system 200 is about to expire. The user may not know what this notification is, or the details of the warranty information mentioned in the notification. The systems and methods described herein, allows the user to request information on this issue as well as make changes to the software services, hardware and software operations, or responses to a multimodal user-query input from the user at the AI productivity tool software application 258. For example, the user AI productivity tool software application 258 may be a chatbot-type AI productivity tool software application 258 that allows a user to provide audio input such as via the microphone, text input such as via the keyboard 248, and image input such as via a captured image of the notification about the warranty (e.g., via a screenshot) to the AI productivity tool subagent 262. Once this multimodal user-query input is received at the AI productivity tool software application 258, the AI productivity tool software application 258 may transmit this multimodal user-query input to the AI productivity tool subagent 262 via the AI productivity tool software plug-in 260 to facilitate the identification of the intent of the multimodal user-query input in a multimodal query intent value and match that multimodal query intent value to a capability associated with one or more AI productivity tool software applications 258.

In order to complete this matching, the intent and capabilities determination software application 264 of the AI productivity tool subagent 262 may have initially or may have previously gathered each capability of each AI productivity tool software applications 258 for storage in an AI productivity tool software application capability database 286 within capability nodes of a hierarchical capabilities decision tree according to embodiments herein. In an example embodiment, the intent and capabilities determination software application 264 may gather identified capabilities associated with each AI productivity tool software application 258 and generate a multimodal capability intent value for each capability for storage with the capability node. In an embodiment, execution of the intent and capabilities determination software application 264 may determine multimodal capability intent values associated with natural language textual and non-textual modality descriptions of the gathered capabilities for each of a plurality of AI productivity tool-enablable software applications 288. These multimodal capability intent values are a mathematical representation of descriptors of the capability operations or services from various AI productivity tool-enablable software applications and may be represented by a mathematical value that is an embedded multimodal capability intent value in a multi-axis vector space that may be associated with a natural language textual and non-textual modality descriptions for that capability in a capability node.

As described herein, the intent and capabilities determination software application 264 may call an SDK module 266. The SDK module 266 may include any machine-readable program code instructions that is executed by the hardware processor 202 or other hardware processing resource to request that an ML model algorithm 278 be invoked to support an identification of the capabilities associated with each AI productivity tool software application 258 as well as request one or more ML model algorithms 278 to generate the multimodal capability intent value from textual and non-textual (e.g., image) descriptions for each identified capability. These invoked ML model algorithms may include any ML model algorithm 278 that can gather or otherwise identify the capabilities associated with each of the AI productivity tool software applications 258 and may, either in real-time or prior to execution of the OTB AI productivity tool subagent 262, determine from natural language textual and/or non-textual modality descriptions provide for each of the capabilities of each of the AI productivity tool-enablable software applications multimodal capability intent values that may be used when interfacing with the OTB AI productivity tool subagent 262. In embodiments herein, the natural language textual and non-textual modality descriptions of capabilities associated with the AI productivity tool software applications 258 may be stored in the AI productivity tool-enablable software application capability database 286 in each capability node for that capability.

As mentioned, these capabilities may be organized into capability nodes in a hierarchical capability decision tree such as a DAG decision tree and then searchable via execution of machine-readable program code instructions of a DAG capability intent search module 284. The parent-child relationship of each capability to each other within the hierarchical capabilities decision tree may also be stored at the AI productivity tool-enablable software application capability database 286 with the capabilities being mapped in capability nodes of branches using logical parent-child relationships between and among the plurality of natural language textual and non-textual modality descriptions of the capabilities. Each capability node of this hierarchical capabilities decision tree may include a capability name, capability identification (ID) (e.g., in alphanumeric values), and a natural language textual and non-textual modality descriptions of the capability, among other attributes. In embodiments, each capability node may further include a multimodal capability intent value. In other embodiments one or more keywords within the capability natural language textual and non-textual modality descriptions may be included in the capability node. In the context of the present specification, these capabilities in the capability nodes may include any combination of the textual or non-textual attributes of the text, audio, video, or image modalities of descriptions for each the capabilities.

In example embodiments, capabilities associated with Dell® Support Assist® software application 295 may include capabilities that monitor for warranty information of each of the hardware devices within the information handling system 200. The capabilities associated with this AI productivity tool software application 258 may therefore have non-textual attributes that include potential images that show screenshots of an error message or notification from the Dell® Support Assist® software application 295 related to the status of warranties of the hardware devices within the information handling system 200. The execution of the machine-readable program code instructions of the intent and capabilities determination software application 264 and ML model algorithms herein allow for non-textual attributes to be identified (e.g., visual features within the image or video) and assigned a capability intent value to that capability if available in some embodiments although some capabilities may also have natural language text descriptions or just a natural language description. As described in more detail herein, the hardware processor 202 or other hardware processing device may execute machine-readable code instructions for one or more text embedding ML model algorithms (e.g., 281) in an embodiment for a capability that has a natural language text description to generate a textual vector capability intent value for that identified capability. In further embodiments, a visual transformer ML model algorithm 280 may generate a non-textual image capability intent value based on the visual features of an image depicting a notification message related to the hardware devices within the information handling system 200 and which is associated with that capability. The textual capability intent value and any non-textual image capability intent value may be combined to generate a vectorized multimodal capability intent value via execution of the text and image intent-to-multimodal intent embedding ML model algorithm 181 in embodiments herein. Various capabilities for AI productivity tool software applications 288 may execute on the information handling system and may include, for example, capabilities of the Dell® Support Assist® software application 295, remediation (AMDS) software application 290, Dell® optimizer software application 291, Dell® Trusted Device® software application 292, Dell® Display and Peripheral Manager® software application 293, Alienware® Command Center (AWCC) software application 294, and/or a virtual assistant module 296 as just some examples. Execution of machine-readable program code instructions for a text and image intent-to-multimodal intent ML model algorithm 281 may operate to generate a multi-dimensional vector capability intent value for text capability intent values and non-textual image intent values of that identified capability by executing combining algorithms according to various embodiments.

In an embodiment, the hierarchical capabilities decision tree is searchable with the execution of the DAG intent capability intent search module 284. The hierarchical capabilities decision tree may arrange capability nodes in branches that may also identify child capability nodes with natural language textual and non-textual modality capability descriptions therewithin as providing greater specificity than its identified parent capability node with natural language textual and non-textual modality descriptions. For example, a parent capability node with natural language textual and non-textual modality descriptions such as "warranty" may have two child capability nodes with natural language textual and non-textual modality descriptions, including "solid-state drive (SSD) warranty," and "battery warranty," each providing a more specific example of the parent phrase "warranty." In an embodiment, any parent capability node with natural language textual and non-textual modality descriptions may be separated from children capability nodes with natural language textual and non-textual modality descriptions within the hierarchical capability decision tree by branches. Each level of the hierarchical capability decision tree may thus include one or more capability nodes identified as a child and connected via a branch to one of the capability nodes in the previous level of the hierarchical capability decision tree. Each capability node with natural language textual and non-textual modality descriptions identified as a child in such a way within the hierarchical capability decision tree may include an identification of its parent capability node or parent capability natural language textual and non-textual modality descriptions.

Once the capabilities have been identified and logically arranged within the hierarchical capabilities decision tree, the identified capabilities may be stored on the AI productivity tool-enablable software application capability database 286. The hierarchical capabilities decision tree may be used later for matching a multimodal query input intent value to a multimodal capability intent value associated with a capability of one or more AI productivity tool-enablable software applications 288.

According to the example embodiment described herein, a user may be presented with a warranty notification via the video display device 246 of the information handling system 200. The user may wish to inquire about the warranty information and inquire to be directed to a website or other information source to provide more information on the warranty and receive further instructions to address the warranty notification such as directions to order a new hardware device or extend the warranty. In an embodiment, the user may provide multimodal user-query input at the AI productivity tool software application 258 that may include text, audio and an image such as a screenshot of the warranty notification, voice audio from the user at the microphone 256, or text query input related to the warranty notification.

In an embodiment, the user may provide some combination of text query input, audio query input, and image query input as the multimodal user-query input at the AI productivity tool software application 258 and the intent and capabilities determination software application 264 may cause that any number of ML model algorithms be executed in order to determine the intent of the user in a multimodal query intent value as described herein. In an example embodiment, the intent and capabilities determination software application 264 may call a software development kit (SDK) module 266. The SDK module 266 may include any machine-readable program code instructions that is executed by the hardware processor 202 or other hardware processing resource to request that an ML model algorithm 278 be invoked to generate, in an embodiment, a multimodal intent value based on received multimodal user-query input from a user. For example, the ML model algorithm 278 may include visual transformer ML model algorithm 280 to generate a non-textual image query intent value, if any images are included in the multimodal user-query input. As described herein, the user may provide an image to the AI productivity tool software application 258 that may include a notification or error message. This image may be obtained via the user capturing a screen shot, the user uploading a specific notification, or other processes of submitting an image to the AI productivity tool software application 258. The visual transformer ML model algorithm 280 may be used to identify visual features within the image user-query input and generate the multimodal intent value.

In another example, the ML model algorithms 278 may include the ASR ML model algorithm 279 and a text embedding ML model algorithm 277 to generate a text query intent value if any audio is included in the multimodal intent value. The audio ASR ML model algorithm 279 may recognize the speech in the audio and transfer it into text to generate text query intent value. The text embedding ML module may then execute to generate a textual query intent value. In another example, the ML model algorithms 278 may include a text embedding ML model algorithm 277 to generate a textual query intent value from text provided by the user at the AI productivity tool software application 258 by the user typing into an interface associated with the AI productivity tool software application 258. In yet another example, the ML model algorithms 278 may include the text and image intent-to-multimodal intent embedding ML model algorithm 281 to generate a multimodal intent value from the multimodal user-query input that includes both images and text. In an embodiment, each of the ASR ML model algorithm 279, the visual transformer ML model algorithm 280, the text embedding module 277, and the text and image intent-to-multimodal intent embedding ML model algorithm 281, receives the multimodal user-query input, identifies the type of mode or modes the multimodal user-query input is in, and with various modality embedding algorithms generates a vectorized multimodal query intent value for the multimodal user-query input.

In another aspect, the ML model algorithm 278 may also include the multimodal query intent-to-capability matching ML model algorithm 282 that receives the assigned vectorized multimodal query intent value of a user-query as input. The hardware processor 202 executing computer readable code instructions of the multimodal query intent-to-capability matching ML model algorithm 282 executes a semantic search comparison and matches the vectorized multimodal query intent value to a vectorized capability intent value associated with the AI productivity tool-enablable software application 288 from the hierarchical capabilities decision tree that can serve as the capability intent action responsive to the multimodal user-query input.

It is appreciated that the selected ML model algorithms 278 used in various phases may satisfy an interface contract 270 requested by the intent and capabilities determination software application 264 such that their multimodal execution generates the query intent value from the multimodal user-query input that may then be matched with and an available capability associated with one of the plurality of AI productivity tool-enablable software applications 288. This best matched capability may then be executed as the capability intent action responsive to the multimodal user-query input from the user. The interface contract 270 described herein defines the requirements that selected ML model algorithms 278 are to have in order to be able receive a specific type of input (e.g., text, audio, video, images) from the intent and capabilities determination software application 264 or any AI productivity tool-enablable software application 288 and to provide a specific type of output to the intent and capabilities determination software application 264. In an embodiment, the interface contract 270 is generated by an AI productivity proxy API 268 invoked by the SDK module 266 in order to identify the specific ML model algorithm 278 that provides the appropriate output to the intent and capabilities determination software application 264. The execution of the machine-readable program code of the intent and capabilities determination software application 264 allows a user to interface with the AI productivity tool software application 258 (e.g., via text, audio, images, etc.) and have a responsive action, such as a hardware operation, software service, or other response from the information handling system 200 that satisfies the user's query input.

In a specific embodiment, the hardware processor 202 may execute machine-readable code instructions of the intent and capabilities determination software application 264 utilizes the multimodal query intent-to-capability matching ML model algorithm 282 to perform a cosine similarity search or comparison that compares the vectorized multimodal user-query input intent value and vectorized multimodal capability intent values to determine the contextual similarity between the natural language textual and non-textual modality descriptions of the capability and the multimodal user-query input (e.g., which may include both textual, audio, video, and images). This may be performed for several of the capability intent values within the capabilities decision tree to identify a capability intent value that most closely matches or correlates with the multimodal user-query input. In such a way, the hardware processor 202 executing machine-readable program code instructions for the intent and capabilities determination software application 264 may take relevance and context of natural language text and non-textual attributes of, for example, an image (e.g., an image of a warranty notification) within a multimodal user-query input into account when determining a matching or correlating capability of an AI productivity tool-enablable software application 288 that is most likely to address the user's intent within the multimodal user-query input.

In another embodiment, in order to overcome the risk of data saturation, the hardware processor 202 executing machine-readable code instructions for a multimodal query intent-to-capability matching ML model algorithm 182 may search the hierarchical capabilities decision tree via DAG capability intent search module 184 that may limit the number of comparisons made against the multimodal query input intent value based on hierarchical relationships of capabilities in the hierarchical capabilities decision tree and following branches with highest semantic search scores. These hierarchical relationships are identified within metadata and illustrated by the positions of the natural language textual and non-textual modality descriptions of the capabilities, or phrases therewithin, as given in the branches of the hierarchical capabilities decision tree stored at the AI productivity tool-enablable software application capability database 286. For example, the hardware processor 202 executing machine-readable code instructions of the DAG capability intent search module 284 performs a tree-traversal algorithm that may determine, for each capability at a first level of the hierarchical capabilities decision tree, a cosine semantic similarity search score that compares the vectorized multimodal user-query input intent value and the multimodal capability intent values for the natural language textual and non-textual modality descriptions of the capability nodes at the first level. The hardware processor 202 executing machine-readable code instructions of the DAG capability intent search module 184 of the OTB AI productivity tool subagent 262 may then determine a parent best match capability having a highest cosine semantic similarity search score among the capability nodes at the first level of the hierarchical capabilities decision tree and proceed to search down the branch under that parent capability node until one or more childless end-of-branch capability nodes are reached to select among to determine a matching capability.

Instead of performing this determination for each node of the second level of the hierarchical capabilities decision tree, the hardware processor 202 executing machine-readable code instructions for the DAG capability intent search module 284 and multimodal query intent-to-capability matching ML model algorithm 282 (e.g., depending on the multimodalities of the user-query input) may determine a cosine semantic similarity search score only for the children in the branch of the capability natural language textual and non-textual modality descriptions identified as the parent best match capability node for the previous level of the hierarchical capabilities decision tree. Comparison of cosine semantic similarity search scores, as performed via execution of machine-readable code instructions of the multimodal query intent-to-capability matching ML model algorithm 282 by the hardware processor 202 in an embodiment, may be limited at each level of the hierarchical capabilities decision tree to children of the natural language description of the capability at the previous level having a capability intent value generating a highest cosine semantic similarity search score along splits in the branch until one or more childless end-of-branch capability nodes are selected among to determine a matching capability. In some embodiments, the cosine semantic similarity search score for each child capability node may be weighted by the cosine semantic similarity search score for its parent down to the childless end-of-branch capability nodes are selected to determine a matching capability. In such a way, the hardware processor 202 executing machine-readable code instructions of the DAG capability intent search module 184 and multimodal query intent-to-capability matching ML model algorithm 182 may consistently narrow focus of comparisons between the multimodal query input intent value and the plurality of multimodal capability intent values for natural language textual and non-textual modality descriptions of increasing specificity. The natural language capability of one or more childless end-of-branch capability nodes for an AI productivity tool-enablable software application 288 having the highest cosine semantic similarity search score or highest parent-score weighted cosine semantic similarity search score, in various embodiments, may then be identified, via execution of machine-readable code instructions of the OTB AI productivity tool subagent 262 by the hardware processor 202, as the capability most likely to address the user's intended request within the multimodal user-query input. In the context of the example presented here, this responsive action may be the provision of additional warranty information to the user such as a warranty ID and effected hardware devices within the information handling system as well as provide access to a website that may allow a user to change warranty features of the current warranty.

Figure 3:
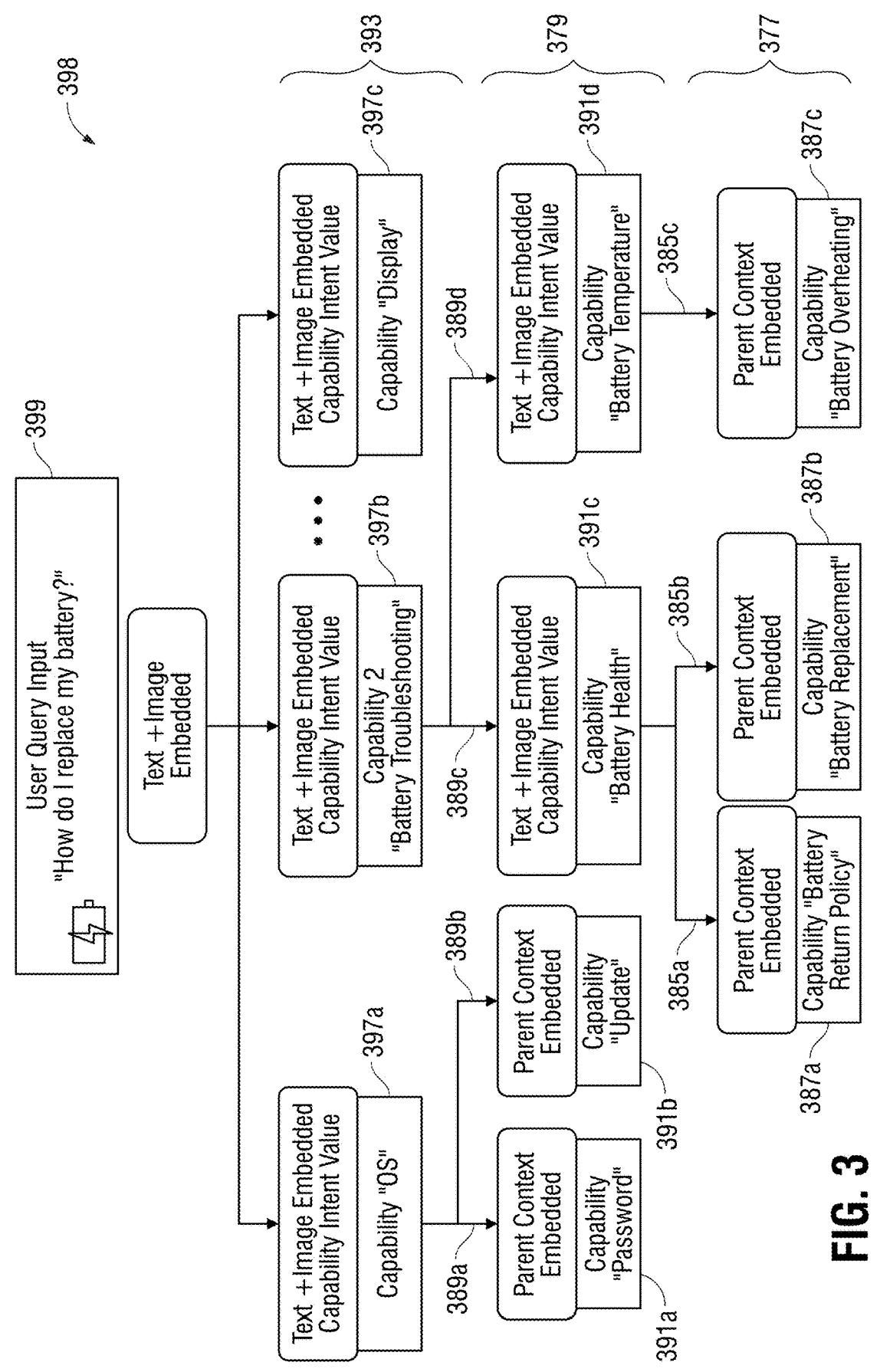
FIG. 3 is a block diagram illustrating a hierarchical capabilities decision tree defining parent-child relationships among a plurality of natural language textual and non-textual modality descriptions of capabilities having multimodal capability intent values associated with each of a plurality of AI productivity tool-enablable software applications according to an embodiment of the present disclosure.

FIG. 3 is a block diagram illustrating a hierarchical capabilities decision tree defining parent-child relationships among a plurality of natural language textual and non-textual modality descriptions of capabilities associated with each of a plurality of AI productivity tool-enablable software applications according to an embodiment of the present disclosure. For case of explanation in FIG. 3, the natural language textual and non-textual modality descriptions may include text and image attributes that are to be embedded into the identified capabilities at each capability node. It is appreciated that other types of attributes such as audio attributes may also be embedded into the identified capabilities. As described herein, the natural language textual and non-textual modality descriptions of capabilities at each capability node for the AI productivity tool-enablable software applications in an embodiment may be organized into a hierarchical capabilities decision tree 398 that maps logical parent-child relationships between and among the plurality of natural language descriptions of capabilities of capability nodes in an embodiment.

Each capability node of this hierarchical capabilities decision tree may include a capability name, capability identification (ID) (e.g., in alphanumeric values), and a natural language textual and non-textual modality descriptions of the capability, among other attributes. In some embodiments, each capability node may further include a multimodal capability intent value, or one or more keywords within the capability natural language textual and nontextual modality descriptions. In the context of the present specification, the organization of these capabilities is based on both the textual and non-textual attributes that describe the text, audio, video, or image attributes of the capabilities. Some capability nodes may have only one capability description while others may have plural capabilities for descriptions. In each example described, the capability node is shown with its natural language description phrase for case of explanation but may also include an image or other non-textual description.

As an example, a capability node 397*a* in an embodiment may include a natural language description phrase of "Operating System," and may also include a capability name, and a capability ID. In yet another example, a capability node 397*b* in an embodiment may include a natural language description phrase of "battery troubleshooting," and may also include a capability name, and a capability ID. In still another example, a capability node 397*c* in an embodiment may include a natural language description phrase of "display," and may also include a capability name, and a capability ID. As yet another example, a capability node 391*a* in an embodiment may include a natural language description phrase of "password," and may also include a capability name, and a capability ID. In yet another example, a capability node 391*b* in an embodiment may include a natural language description phrase of "update," and may also include a capability name, and a capability ID. For another example, a capability node 391*c* in an embodiment may include a natural language description phrase of "battery health," and may also include a capability name, and a capability ID. In another example, a capability node 391*d* in an embodiment may include a natural language description phrase of "battery temperature," and may also include a capability name, and a capability ID. As yet another example, a capability node 387*a* in an embodiment may include a natural language description phrase of "battery return policy," and may also include a capability name, and a capability ID. In yet another example, a capability node 387*b* in an embodiment may include a natural language description phrase of "battery replacement," and may also include a capability name, and a capability ID. In still another example, a capability node 387*c* may include a natural language description phrase of "Battery overheating," and may also include a capability name, and a capability ID.

In addition to each of these capability nodes including a capability name and a capability ID, each capability node is associated with both natural language textual and non-textual modality descriptions. For example, capability node 391*c* may include a natural language textual description of "battery health" but also includes a non-textual modality description that includes image features that would be included in an image of a battery notification a user may receive during operation of the information handling system. Again, these image features may include, for example, an image feature of a computer, an image feature of a battery of the computer, an image feature of a highlighted text, a manufacturer logo, or any other attention-drawing image features that would indicate that the image modality of user input is describing a battery notification. In some embodiments, each of the capability nodes 397*a*, 397*b*, 397*c*, 391*a*, 391*b*, 391*c*, 391*d*, 387*a*, 387*b*, 397*c* may further include a multimodal capability intent value as generated from textual or non-textual descriptions and one or more keywords within the capability natural language description. For example, capability node 391*c* may include example keywords such as "charge," "warranty," and "battery." The hierarchical capabilities decision tree 398 described with reference to FIG. 3 is only one example that includes a handful of natural language descriptions for capabilities, and it is contemplated that other embodiments may include any number of such natural language descriptions for capabilities, as dependent upon the number of natural language descriptions of capabilities for a plurality of AI productivity tool-enablable software application that are gathered and available on the information handling system and stored within the natural language capabilities database.

The hierarchical capabilities decision tree 398 in an embodiment may have branches that identify child capability nodes with child capability natural language descriptions or phrases therewithin as providing greater specificity than its identified parent capability natural language description or phrases in a parent-child hierarchy. For example, a parent capability node 391*c* for a capability natural language description phrase such as "battery health" may have two child capability nodes 387*a* and 387*b* for capability natural language description phrases, including "battery return policy," and "battery removal," respectively, with each child capability node 387*a* and 387*b* providing a more specific example of the parent capability node 391*c* phrase "battery health." As another example, a parent capability node 397*a* for a capability natural language description phrase such as "operating system" may have two child capability nodes 391*a* and 391*b* for capability natural language description phrases, including "password," and "update," respectively, with each child capability node 391*a* and 391*b* providing a more specific example of the parent capability node 397*a* phrase "operating system." In another example, a parent capability node 397*b* for a capability natural language description phrase such as "battery troubleshooting" may have two child capability nodes 391*c* and 391*d* for capability natural language description phrases, including "battery health," and "battery temperature," respectively, with each child capability node 391*c* and 391*d* providing a more specific example of the parent capability node 397*b* phrase "battery troubleshooting." It is appreciated that other capability nodes such as capability node 397*c* with a natural language description phrase "display" may not include any children capability nodes while still other capability nodes such as capability node 391*d* with the natural language description phrase "battery temperature" may include a single child capability node 387*c* with a natural language description phrase "battery overheating."

Parent capability nodes for capability natural language descriptions or phrases may be separated from child capability nodes for capability natural language descriptions or phrases within the hierarchical capability decision tree 398 in an embodiment by branches. Each level of the hierarchical capabilities decision tree 398 may thus include one or more capability nodes identified as a child and connected via a branch to one of the capability nodes in the previous level of the hierarchical capability decision tree 398. Each capability natural language description or phrase identified as a child in such a way within the hierarchical capabilities decision tree 398 may include an identification of its parent capability node or parent capability natural language description/phrase.

For example, in the first level 393, the parent capability node 397*a* does not include an identification of a parent capability node because it is a root capability node within a first branch of the hierarchical capabilities decision tree. Parent capability nodes 397*b* and 937*c* are also similarly root capability nodes for second and third branches respectively within the hierarchical capabilities decision tree and fall within the first level 393. Additionally, in the second level 379, the child capability node 391*a* may include an identification of its parent capability node 397*a*, and may be connected to the parent capability node 397*a* via branch 389*a*. In yet another example, in the second level 379, the child capability node 391*b* may include an identification of its parent capability node 397*a*, and may be connected to the parent capability node 397*a* via branch 389*b*. In another example, in the second level 379, the child capability node 391*c* may include an identification of its parent capability node 397*b*, and may be connected to the parent capability node 397*b* via branch 389*c*. As yet another example, in the second level 379, the child capability node 391*d* may include an identification of its parent capability node 397*b*, and may be connected to the parent capability node 397*b* via branch 389*d*. In yet another example, in the third level 377, the child capability node 387*a* may include an identification of its parent capability node 391*c*, and may be connected to the parent capability node 391*c* via branch 385*a*. As still another example, in the third level 377, the child capability node 387*b* may include an identification of its parent capability node 391*c*, and may be connected to the parent capability node 391*c* via branch 385*b*. In yet another example, in the third level 377, the child capability node 387*c* may include an identification of its parent capability node 391*d*, and may be connected to the parent capability node 391*d* via branch 385*c*.

Again, the execution of the machine-readable program code instructions of the intent and capabilities determination software application of the AI productivity tool subagent may navigate parent-child relationships with each capability of each AI productivity tool software application that are represented by capability nodes in this capability decision tree 398 via execution of a tree-traversal algorithm of the DAG capability intent search module. As described in embodiments herein, the intent and capabilities determination software application may identify each capability associated with each AI productivity tool software application and assign a multimodal capability intent value along with the capability ID and capability name. In an embodiment, execution of the intent and capabilities determination software application may determine multimodal capability intent values associated with natural language textual and non-textual modality descriptions of the gathered capabilities for each of a plurality of AI productivity tool-enablable software applications through execution of one or more ML model algorithms. These multimodal capability intent values are each a mathematical representation of descriptors of the capability operations or services from various AI productivity tool-enablable software applications and may be represented by a mathematical value that is an embedded capability intent value in a multi-axis vector space that may be associated with a natural language textual and non-textual modality descriptions for that capability.

As described herein, the intent and capabilities determination software application may call an SDK module. The SDK module may request that an ML model algorithm be invoked to support an identification of the capabilities associated with each AI productivity tool software application as well as request an ML model algorithm to generate and assign a multimodal capability intent value to each identified capability according to embodiments herein. The intent and capabilities determination software application may also request that the ML model algorithms generate and assign such a multimodal capability intent value to each identified capability at each of the capability nodes 397*a*, 397*b*, 397*c*, 391*a*, 391*b*, 391*c*, 391*d*, 387*a*, 387*b*, 397*c*.

These invoked ML model algorithms may include any ML model algorithm that can gather or otherwise identify the capabilities associated with each of the AI productivity tool software applications and may, either in real-time or prior to execution of the OTB AI productivity tool subagent, describe in natural language textual and non-textual modality descriptions of each of the capabilities of each of the AI productivity tool-enablable software applications that may be used when interfacing with the OTB AI productivity tool subagent. In embodiments herein, the natural language textual and non-textual modality descriptions of capabilities associated with the AI productivity tool software applications may be stored in the AI productivity tool-enablable software application capability database. As mentioned, these capabilities may be organized into the hierarchical capabilities decision tree 398. The relationship of each capability to each other within the hierarchical capabilities decision tree 398 may also be stored at the AI productivity tool-enablable software application capability database with the capabilities being mapped using logical parent-child relationships between and among the plurality of natural language textual and non-textual modality descriptions as shown in FIG. 3.

Each capability node of this hierarchical capabilities decision tree 398 may include the capability name, capability identification (ID) (e.g., in alphanumeric values), a natural language textual and non-textual modality descriptions of the capability, among other attributes. In some embodiments, each capability node 397*a*, 397*b*, 397*c*, 391*a*, 391*b*, 391*c*, 391*d*, 387*a*, 387*b*, 397*c* may further include the generated multimodal capability intent value and one or more keywords within the capability natural language textual and non-textual modality descriptions. In the context of the present specification, the organization of these capabilities is based on both the textual and non-textual attributes of the text, audio, video, and image attributes of the capabilities. For example, capabilities associated with Dell® Support Assist® software application may include capabilities that monitor for warranty and operational information of each of the hardware devices within the information handling system.

The capabilities associated with this AI productivity tool software application may therefore have non-textual attributes that include potential images that show screenshots of an error message or notification from the Dell® Support Assist® software application related to the status of warranties and/or operational notifications or errors of the hardware devices within the information handling system. The execution of the machine-readable program code instructions of the intent and capabilities determination software application and ML model algorithms herein allow for non-textual attributes to be identified (e.g., visual features within the image or video) and assigned a multimodal capability intent value to that capability. As described in more detail herein, the hardware processor or other hardware processing device may execute machine-readable code instructions for one or more text embedding ML model algorithms and non-textual embedding algorithms such as a visual transform algorithm to generate a textual vector capability intent value and a non-textual image vector capability intent value for that identified capability. The textual and non-textual capability intent values may be then combined into the multimodal vector capability intent value that, for example, may be based on the visual features of an image depicting a notification message related to the hardware devices within the information handling system and text description and which is associated with that capability of the Dell® Support Assist® software application or any other AI productivity tool-enablable software applications (e.g., remediation (AMDS) software application, Dell® optimizer software application, Dell® Trusted Device® software application, Dell® Display and Peripheral Manager® software application, Alienware® Command Center (AWCC) software application, and/or a virtual assistant module).

It is appreciated that, in some embodiments, a semantic scoring search process may be conducted such that the correct capability may be identified within the hierarchical capabilities decision tree via execution of the machine-readable program code instructions of the DAG capability intent search module. For example, the hardware processor executing machine-readable code instructions of the DAG capability intent search module performs a tree-traversal algorithm that may determine, for each capability node at a first level 393 of the hierarchical capabilities decision tree 398, a cosine semantic similarity search score that compares the vectorized multimodal user-query input intent value of the user query input 399 and the multimodal capability intent values for the natural language textual and non-textual modality descriptions of the capability nodes 397a, 397b, 397c at the first level 393. By way of an explanatory example embodiment, the user query input 399 may be received in plural modalities such as natural language query for "How do I replace my battery?" along with an image of a battery error message on a video display device of the information handling system. The hardware processor executing machine-readable code instructions of the DAG capability intent search module of the OTB AI productivity tool subagent may then determine a parent best match capability having a highest cosine semantic similarity search score among the capability nodes at the first level of the hierarchical capabilities decision tree 398 and proceed to search down the selected branch under that parent capability node until one or more childless end-of-branch capability nodes are selected to determine a matching capability. In one example embodiment, the user-query input may include multimodal user-query input that includes an image of a notification related to the battery of the information handling system. This image may include image features (text, logos, specific images such as a battery icon and a computer, etc.) that, as described herein, allow for the generation of a multimodal query input intent value. The execution of the machine-readable program code of the DAG capability intent search module results in a relatively higher score for the capability node 397b with a natural language description of "Battery troubleshooting." Because this parent capability node 397b has two child capability nodes, the process proceeds to search down the branch 389c and 389d under that parent capability node 397b until one or more childless end-of-branch capability nodes are selected to determine a matching capability.

Again, instead of performing this determination for each capability node of the second level of the hierarchical capabilities decision tree 398, the hardware processor executing machine-readable code instructions for the DAG capability intent search module and the multimodal query intent-to-capability matching ML model algorithm. The multimodal query intent-to-capability matching ML model algorithm may determine a cosine semantic similarity search score only for the children capability nodes (e.g., nodes 391c and 391d) in the selected branch of the capability natural language textual and non-textual modality descriptions identified under the parent best match capability node 397b for the previous level of the hierarchical capabilities decision tree 398 according to the tree traversal algorithm executed in an embodiment.

Comparison of cosine semantic similarity search scores, as performed via execution of machine-readable code instructions of the multimodal query intent-to-capability matching ML model algorithm by the hardware processor may be limited at each level 393, 379, 377 of the hierarchical capabilities decision tree 398 to children (e.g., 391c, 391d) of the natural language description of the capability at the previous level having a capability intent value generating a highest parent cosine semantic similarity search score (e.g., 391c) along splits in the selected branch until one or more childless end-of-branch capability nodes are selected to determine a matching capability. In some embodiments, the cosine semantic similarity search score for each child capability node may be weighted by the cosine semantic similarity search score for its parent down to the childless end-of-branch capability nodes are selected to determine a matching capability. In such a way, the hardware processor executing machine-readable code instructions of the DAG capability intent search module and multimodal query intent-to-capability matching ML model algorithm may consistently narrow focus of comparisons between the multimodal query input intent value and the plurality of multimodal capability intent values for natural language textual and non-textual modality descriptions of increasing specificity. The natural language capability of one or more childless end-of-branch capability nodes for an AI productivity tool-enablable software application having the highest parent-score weighted cosine semantic similarity search score may then be identified, via execution of machine-readable code instructions of the OTB AI productivity tool subagent by the hardware processor, as the capability most likely to address the user's intended request within the multimodal user-query input. In such a way, the hardware processor executing code instructions for the DAG capability intent search module and multimodal query intent-to-capability matching ML model algorithm may overcome or lessen the impacts of data saturation encountered by comparing the multimodal query input intent value to all multimodal capability intent values, and may thus decrease consumption of processing resources.

Figure 4:
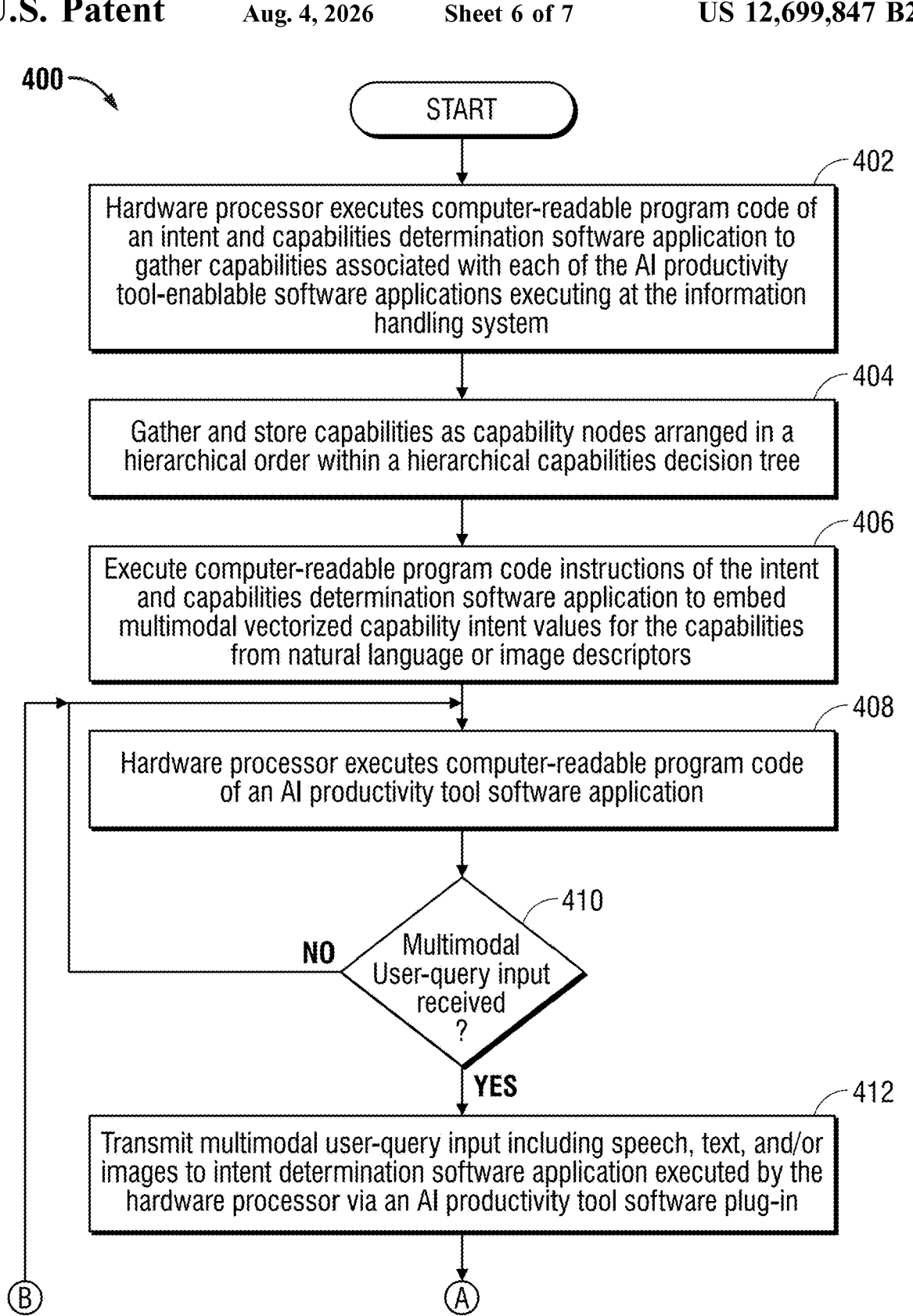
FIG. 4 is a flowchart showing a method of executing computer readable code instructions of an on the box (OTB) artificial intelligence (AI) productivity tool at an information handling system to select among a plurality of AI productivity tool-enablable software application capabilities to respond to a multimodal user-query input according to an embodiment of the present disclosure.
Figure 4:
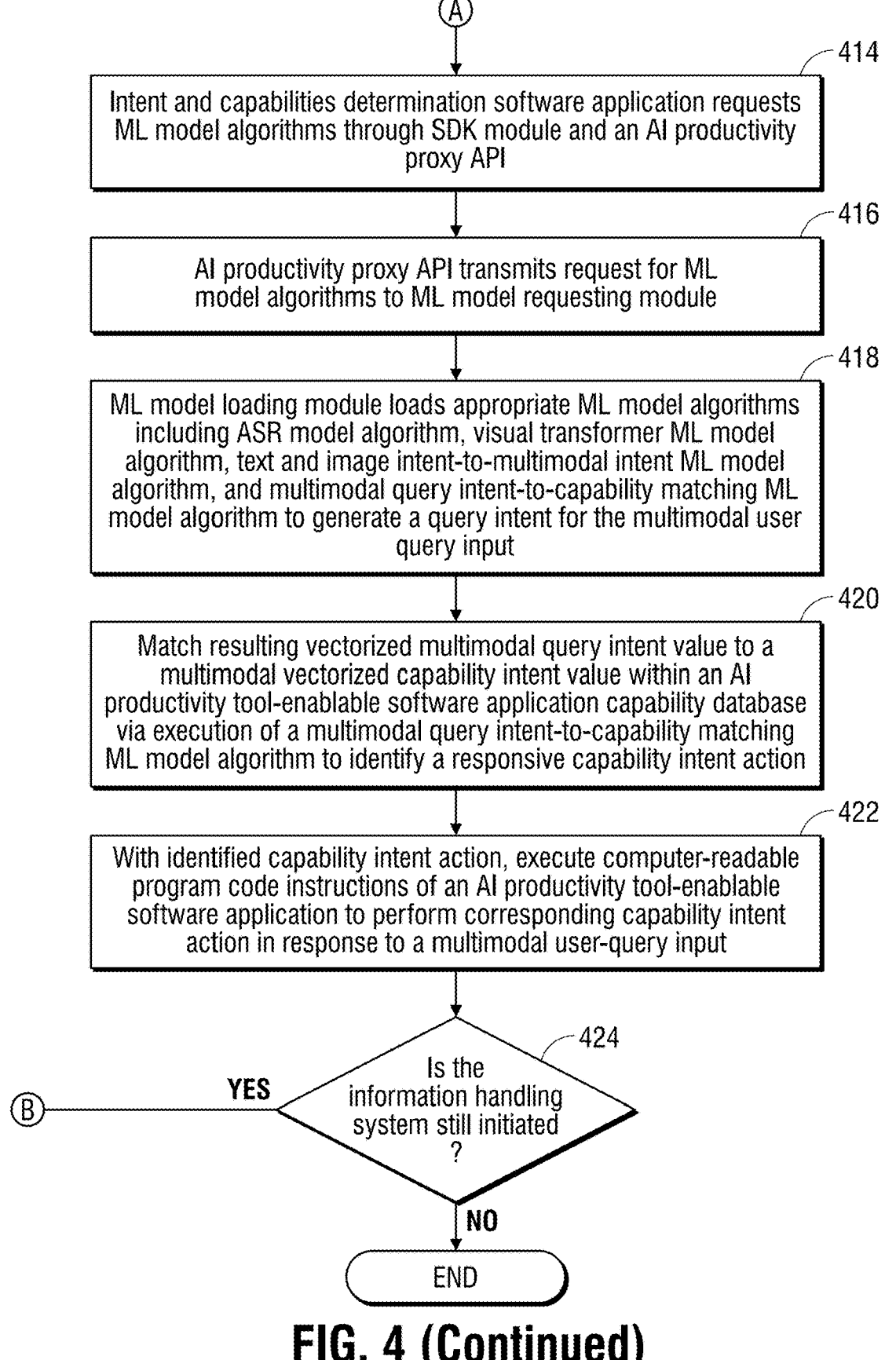

FIG. 4 is a flowchart 400 showing a method of executing computer readable code instructions of an on the box (OTB) artificial intelligence (AI) productivity tool at an information handling system to select among a plurality of AI productivity tool-enablable software application capabilities to respond to a multimodal user-query input according to an embodiment of the present disclosure. It is appreciated that the method 400 described herein may be executed via execution of computer readable program code instructions in firmware or software by a hardware processor or other hardware processing device on an information handling system.

The method 400 may include, at block 402, executing machine-readable program code instructions of an intent and capabilities determination software application. In an embodiment, the execution of the intent and capabilities determination software application may identify and gather each capability associated with each AI productivity tool-enablable software application executable on the information handling system by the hardware processor. It is appreciated that in embodiments herein, that some AI productivity tool-enablable software applications may have similar capabilities and there may be overlapping of capabilities such that capability nodes within a developed hierarchical capabilities decision tree may include capability nodes that have similar capabilities associated with them. In an embodiment, execution of the intent and capabilities determination software application may determine multimodal capability intent values associated with natural language textual and non-textual modality descriptions of the gathered capabilities for each of a plurality of AI productivity tool-enablable software applications. As described embodiments herein, the multimodal capability intent value may be generated from a combination of a textual capability intent value from a textual embedding ML model algorithm and a non-textual embedding ML model algorithm. These multimodal capability intent values are a mathematical representation of blended textual and non-textual descriptors of the capability operations or services from various AI productivity tool-enablable software applications and may be represented by a mathematical value that is an embedded multimodal capability intent value in a multi-axis vector space associated with a natural language textual and non-textual modality descriptions for that capability. A similar process may be applied to received multimodal user-query input received at an AI productivity tool in embodiments herein. As described herein, the intent and capabilities determination software application may call an SDK module. The SDK module may include any machine-readable program code instructions that is executed by the hardware processor or other hardware processing resource to request that an ML model algorithm be invoked to support an identification of the capabilities associated with each AI productivity tool software application as well as request and ML model algorithm to generate textual and non-textual capability intent values and combine them into a multimodal capability intent value for each identified capability.

At block 404, the identified capabilities of the AI productivity tool-enablable software applications are gathered and stored in a hierarchical capabilities decision tree in embodiments herein. The hierarchical capabilities decision tree may be formed, such as for the AI productivity tool with related branches of capability nodes. The invoked ML model algorithms may include any ML model algorithm that can gather or otherwise identify the capabilities associated with each of the AI productivity tool software applications either in real-time or prior to execution of the OTB AI productivity tool subagent. The invoked ML model algorithms gather or otherwise identify the capabilities associated with each of the AI productivity tool software applications with descriptions in natural language textual and/or non-textual modality descriptions of each of the capabilities of each of the AI productivity tool-enablable software applications that may be used when interfacing with the OTB AI productivity tool subagent to generate multimodal capability intent values. In embodiments herein, the natural language textual and non-textual modality descriptions of capabilities associated with the AI productivity tool software applications may be stored in the AI productivity tool-enablable software application capability database.

The parent-child relationship of each capability node to each other within the hierarchical capabilities decision tree may also be stored at an AI productivity tool-enablable software application capability database with the capabilities being mapped using logical parent-child relationships between and among the plurality of natural language textual and non-textual modality descriptions as shown and described in FIG. 3 for example. Each capability node of this hierarchical capabilities decision tree may include a capability name, capability identification (ID) (e.g., in alphanumeric values), and a natural language textual and non-textual modality descriptions of the capability, among other attributes. In some embodiments herein, each capability node may further include a multimodal capability intent value generated from textual or non-textual descriptions of each capability, and one or more keywords within the capability natural language textual and non-textual modality descriptions.

The method 400 includes executing machine-readable program code instructions of the intent and capabilities determination software application to embed the multimodal vectorized capability intent values with each capability node. These multimodal capability intent values are a mathematical representation of descriptors of the capability operations or services from various AI productivity tool-enablable software applications and may be represented by a mathematical value that is an embedded capability intent value in a multi-axis vector space that may be associated with a natural language textual and non-textual modality descriptions for that capability or intent. As described herein, invoked ML model algorithms including any ML model algorithm that can gather or otherwise identify the capabilities associated with each of the AI productivity tool software applications and may, either in real-time or prior to execution of the OTB AI productivity tool subagent, generate from natural language textual and non-textual modality descriptions of each of the capabilities of each of the AI productivity tool-enablable software applications a textual capability intent vector value and a non-textual intent vector value. In an embodiment, the textual and non-textual (e.g., text and image) capability intent values may be embedded separately by generating a vector capability intent value for text of that identified capability with a text embedding algorithm while, for example, a visual transformer ML model algorithm may be used to generate a non-textual vector capability intent value for an image. Examples of the text embedding ML model algorithms may include a Latent Semantic Analysis (LSA) or Latent Dirichlet allocation (LDA), a Word2Vec algorithm or other which includes a neural network trained to understand which terms or phrases should be considered closer or further away from certain synonyms or antonyms, a fully recurrent neural network trained to consider the order of terms within the received user query input or the natural language descriptors, among others. Examples of visual transformer ML model algorithm may include a convolutional neural network, visual transformers, bag of visual words, a BERT encoder model, BERT-like encoder model, and/or a ViT encoder model.

In an embodiment, the generated vector capability intent values for each of the text and image may be combined to create the multimodal vector capability intent value. In various embodiments, the generated textual and non-textual image vector capability intent values generated from the text and image may be averaged together, added together, multiplied together, concatenated, or subjected to a dot product process (e.g., a Euclidean magnitude of the two vectors and the cosine of the angle between them), and the like to obtain the multimodal vector capability intent value. These multimodal capability intent values are a mathematical representation of descriptors of the capability operations or services from various AI productivity tool-enablable software applications and may be represented by a mathematical value that is an embedded multimodal capability intent value in a multi-axis vector space that may be associated with a natural language textual and non-textual modality descriptions for that capability.

At this point, after having identified the capabilities and assigned each capability a capability intent value and to a capability node within the hierarchical capabilities decision tree, the information handling system has been prepared to receive multimodal user-query input to engage with an AI productivity tool software application to receive services, execute operations, or receive responses based on the provided multimodal user-query input. As such, at block 408, the method 400 includes executing machine-readable program code instructions of an AI productivity tool software application. In an example scenario, a user may be presented with a battery notification via the video display device of the information handling system. The user may wish to inquire about the information related to the battery and inquire to be directed to a website or other information source to provide more information on, for example, a battery warranty, battery replacement information, or further instructions to extend the warranty of the battery. In an embodiment, the user may provide multimodal user-query input at the AI productivity tool software application that may include text, audio, and an image such as a screenshot or other image of the warranty notification. In an embodiment, the AI productivity tool software application may be a chatbot-type AI productivity tool software application that allows a user to provide audio input via a microphone, text input via a keyboard, and image input via a graphical user interface (e.g., copy and paste operation or drag and drop operation) associated with the AI productivity tool software application.

At block 410, the information handling system executing the machine-readable program code instructions of the AI productivity tool software application may determine if and when multimodal user-query input has been received from the user. Where no multimodal user-query input has been received, the method 400 returns to block 408 as described herein to monitor for any multimodal user-query input. However, where multimodal user-query input is detected, the method proceeds to block 412.

At block 412, the method 400 includes transmitting the multimodal user-query input including speech (audio data), text, and/or images to an intent and capabilities determination software application via an AI productivity tool software plug-in. As described herein, the execution of the intent and capabilities determination software application causes the multimodal user-query input to be matched with appropriate capabilities of an AI productivity tool software application.

At block 414, the method includes the intent and capabilities determination software application requesting that any number of ML model algorithms be executed in order to determine the multimodal query intent vector value of the user-query input as described herein and identify a matching capability to respond to the multimodal user-query input. In an example embodiment, the intent and capabilities determination software application may call an SDK module and an AI productivity proxy API. The SDK module may include any machine-readable program code instructions that is executed by the hardware processor or other hardware processing resource to request that one or more ML model algorithm be invoked to support an identification of, in an embodiment, a responsive capability to perform a capability intent action responsive to a received multimodal user-query input from a user.

At block 416, the method 400 includes the AI productivity proxy API transmitting the request for ML model algorithm to an ML model requesting module that discovers the appropriate ML models to use to facilitate the matching process. Thus, at block 418, the ML model loading module loads the appropriate ML model algorithms including ASR ML model algorithm, the text embedding ML model algorithm, the visual transformer ML model algorithm, the text and image intent-to-multimodal intent ML model algorithm, or the multimodal query intent-to-capability matching ML model algorithm. The visual transformer ML model algorithm 280 may be executed if any images are included in the multimodal user-query input to generate a non-textual query intent value for the images. The text embedding ML model algorithms may be executed for natural language text descriptions or speech converted to text that are included in the multimodal user-query input to generate a textual query intent capability value. The ASR ML model algorithm may be executed if any audio such as speech from the user is included in the multimodal user-query input. In an embodiment, the textual and non-textual (e.g., text and image) query intent values may be embedded separately by generating a vector textual query intent value for text of the user-query input with a text embedding algorithm while, for example, a visual transformer ML model algorithm may be used to generate a non-textual vector query intent value for an image in the user-query input. Examples of the text embedding ML model algorithms may include a Latent Semantic Analysis (LSA) or Latent Dirichlet allocation (LDA), a Word2Vec algorithm or other which includes a neural network trained to understand which terms or phrases should be considered closer or further away from certain synonyms or antonyms, a fully recurrent neural network trained to consider the order of terms within the received user query input or the natural language descriptors, among others. Examples of visual transformer ML model algorithm may include a convolutional neural network, visual transformers, bag of visual words, a BERT encoder model, BERT-like encoder model, and/or a ViT encoder model.

The text and image intent-to-multimodal intent embedding ML model algorithm may be executed if any combination of text and images is included with the multimodal user-query input to generate a multimodal query intent value by combining the text query intent value with the non-textual query intent value. In various embodiments, the generated textual and non-textual image vector query intent values generated may be averaged together, added together, multiplied together, concatenated, or subjected to a dot product process (e.g., a Euclidean magnitude of the two vectors and the cosine of the angle between them), and the like to obtain the multimodal vector query intent value. These multimodal capability intent values are a mathematical representation of modality inputs in the received multimodal user-query input and may be represented by a mathematical value that is an embedded multimodal query intent value in a multi-axis vector space that may be associated with a natural language textual and non-textual modality of that received user-query input.

As described herein, the user may provide an image to the AI productivity tool software application that may include a notification or error message. This image may be accompanied with the speech input and/or text input from the user. The image, in an embodiment, may be obtained via the user capturing a screen shot, the user uploading a specific notification, or other processes of submitting an image to the AI productivity tool software application. To further process the image within the multimodal user-query input, the visual transformer ML model algorithm may be used to identify visual features within the image user-query input and generate the multimodal intent value. Further, the ASR ML model algorithm generates a text from speech and a text embedding ML model algorithm may be used to generate query intent value if any audio is included in the multimodal intent value. The ASR ML model algorithm recognizing the speech in the audio and transfer it into text for text embedding to generate text query intent value in an example embodiment. Additionally, the text embedding ML model algorithm generates a text query intent value from text provided by the user at the AI productivity tool software application when the user types into an interface associated with the AI productivity tool software application in some embodiments. The text and image intent-to-multimodal intent embedding ML model algorithm may then be executed if any combination of text and images is included with the multimodal user-query input to generate a multimodal capability intent value from the textual capability intent value and a non-textual capability intent value of an image submitted with the user query input in embodiments herein.

The matching process between the multimodal user-query input, now associated with a vectorized intent value, includes the execution of the multimodal query intent-to-capability matching ML model algorithm at block 420 in order to match the resulting multimodal query vectorized intent value to a vectorized multimodal capability intent value within an AI productivity tool-enablable software application capability database. In a specific embodiment, the hardware processor may execute machine-readable code instructions of the intent and capabilities determination software application to invoke the multimodal query intent-to-capability matching ML model algorithm to perform a cosine similarity search or comparison that compares the vectorized multimodal query input intent value and vectorized multimodal capability intent value to determine the contextual similarity between the natural language textual and non-textual modality descriptions of the capabilities and the multimodal user-query input (e.g., which may include any of textual input, audio input, video, or images). This may be performed for several of the capability intent values within the hierarchical capabilities decision tree to identify a first level parent capability intent value that most closely matches or correlates with the multimodal user-query input. A tree-traversal is executed by the DAG capability intent search module to determine the selected branch under a first level parent capability node and then identify the highest cosine semantic similarity search score of a childless end-of-branch capability node in the selected branch as a best match capability in an embodiment. In other embodiments, a highest parent cosine similarity score weighted cosine semantic similarity search score of a childless end-of-branch capability node in the selected branch may be used to identify the best match capability. In such a way, the hardware processor executing machine-readable program code instructions for the intent and capabilities determination software application may take relevance and context of natural language text and non-textual attributes of, for example, an image (e.g., an image of a warranty notification) within a multimodal user-query input into account with any speech or textual input in a multimodal user query input when determining a matching or correlating capability of an AI productivity tool-enablable software application that is most likely to address the user's intent within the multimodal user-query input.

Once the intent action has been identified at block 420, the method 400 includes executing machine-readable program code instructions of an AI productivity tool-enablable software application to perform the corresponding intent action for the best match capability at block 422. In one example embodiment, the multimodal user-query input from the user has the user inquiring about the warranty notification with a speech or textual query and an image of a battery message notification, the intent action may include an AI productivity tool software application such as Dell® Support Assist® software application that will provide further information regarding the battery notification (e.g., warranty related to the battery is expiring, battery replacement information, etc.) as well as direct the user with a response or action to address the battery of the information handling system, provide a form or link to allow a user to extend the warranty of the battery, and/or open a browser application to allow a user to purchase a new battery to replace the old battery.

At this point, the method 400 includes determining whether the information handling system is still initiated at block 424. Where the information handling system is still initiated, the method 400 may proceed to block 408 to monitor for any subsequent multimodal user-query input as described herein. Where the information handling system is no longer initiated, the method 400 may end.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer readable code instructions for an on the box (OTB) artificial intelligence (AI) productivity tool comprising:

a capabilities database memory to store multimodal capability intent values from textual and non-textual natural language descriptions of capabilities of AI productivity tool-enablable software applications executable on the information handling system in a capabilities decision tree with each capability stored under a plurality of branches as a capability node grouped under a branch of the capabilities decision tree according to logical topics in hierarchical parent-child relationships, wherein metadata for each capability node identifies a child capability node or parent capability node of the capability node;

a hardware processor executing machine-readable program code instructions to generate a multimodal query input intent value from a multimodal user query input received via text and an image requesting a response by one of the plurality of AI productivity tool-enableable software applications;

the hardware processor executing machine-readable program code instructions to perform a cosine semantic similarity search comparing the multimodal capability intent values of a plurality of parent capability nodes in a first level of the capabilities decision tree to the multimodal query intent value to determine a select branch for further semantic similarity comparison;

the hardware processor to identify a best match childless end-of-branch capability node in the select branch of the capabilities decision tree having a highest cosine semantic similarity search score with the multimodal query input intent value; and the hardware processor executing machine-readable program code instructions for a best match capability of the best match childless end-of-branch capability node with a first AI productivity tool-enableable software application in response to the multimodal user query input.

2. The information handling system of claim 1, wherein the cosine semantic similarity search includes a parent score weighted cosine semantic similarity search that generates, for each child capability node, a parent weighted cosine similarity search score that is weighted by the cosine similarity search score determined for the parent capability node of that child capability node.

3. The information handling system of claim 1 further comprising:

the hardware processor executing machine-readable program code instructions of the OTB AI productivity tool to generate the multimodal query intent value from a textual query intent value generated with execution of a text embedding machine learning algorithm representing semantic meaning of a textual or speech input of the multimodal user query input combined with a nontextual query intent value generated with execution of a visual transformer learning algorithm representing semantic meaning of the image of the multimodal user query input.

4. The information handling system of claim 1, wherein the multimodal capability intent values are generated by execution of code instructions for a text embedding algorithm for textual portions of the textual natural language description of the capability and execution of code instructions for a visual transformer machine learning algorithm for image portions of the nontextual description of the capability to mathematically represent semantic meaning for the capabilities for correlation with the multimodal query intent input value generated from the multimodal user query input.

5. The information handling system of claim 1, wherein the cosine semantic similarity search determines a degree of angular similarity between vector values for the multimodal capability intent values of capability nodes and the multimodal query input intent value that mathematically represent one or more phrases in text or speech and represent the image as part of the multimodal user query input.

6. The information handling system of claim 1 further comprising:

the hardware processor executing machine-readable program code instructions of the AI productivity tool-enableable software application to perform the best match capability to provide responsive output via text.

7. The information handling system of claim 1 further comprising:

the hardware processor executing machine-readable program code instructions of the AI productivity tool-enableable software application to perform the best match capability to automatically update one or more local software applications.

8. A method of executing computer readable code instructions of an on the box (OTB) artificial intelligence (AI) productivity tool at an information handling system to respond to a multimodal user-query input comprising:

storing, in a capabilities database memory, multimodal capability intent values from textual and non-textual natural language descriptions of capabilities of AI productivity tool-enableable software applications executable on the information handling system in a capabilities decision tree with each capability stored under a plurality of branches as a capability node grouped under a branch of the capabilities decision tree according to logical topics in hierarchical parent-child relationships, wherein metadata for each capability node identifies a child capability node or parent capability node of the capability node;

executing machine-readable program code instructions, via a hardware processor, of a textual embedding algorithm and a nontextual embedding algorithm to generate a multimodal query input intent value from a multimodal user query input received via text and an image requesting a response by one of the plurality of AI productivity tool-enableable software applications;

executing machine-readable program code instructions, via the hardware processor, to perform a cosine semantic similarity search comparing the multimodal capability intent values of a plurality of parent capability nodes in a first level of the capabilities decision tree to the multimodal query intent value to determine a select branch for further semantic similarity comparison;

identifying a best match childless end-of-branch capability node in the select branch of the capabilities decision tree having a highest cosine semantic similarity search score with the multimodal query input intent value; and executing machine-readable program code instructions for a best match capability of the best match childless end-of-branch capability node with a first AI productivity tool-enableable software application in response to the multimodal user query input.

9. The method of claim 8, wherein the cosine score similarity search generates, for each child capability node, a parent weighted cosine similarity search score that is weighted by the cosine similarity search score determined for the parent capability node of the child capability node in the select branch of the capabilities decision tree.

10. The method of claim 8 further comprising:

executing, with the hardware processor, machine-readable program code instructions to store at the capability nodes in the capabilities decision tree the multimodal capability intent values as vectors in a multi-axis vector space, a natural language or non-textual image description of the capability, a capability identification (ID) such as an alphanumeric ID, and metadata identifying a parent capability node of a child capability node.

11. The method of claim 8 further comprising:

executing, with the hardware processor, machine-readable program code instructions of the AI productivity tool-enablable software application to perform the best match capability to provide responsive output via text.

12. The method of claim 8 further comprising:

executing, with the hardware processor, machine-readable program code instructions of the AI productivity tool-enablable software application to perform the best match capability to automatically update one or more local software applications.

13. The method of claim 8, wherein the multimodal capability intent values are generated in at least a portion by execution of code instructions for a text embedding algorithm and the multimodal capability intent values mathematically represent semantic meaning for words or phrases within the natural language descriptions for the capabilities for correlation with the multimodal query intent input value generated from text or speech converted to text within the multimodal user-query input.

14. The method of claim 8, wherein the multimodal capability intent values are generated in at least a portion by execution of code instructions for a non-textual embedding algorithm that is a visual transformer algorithm and the multimodal capability intent values mathematically represent visual meanings for image features within associated images for the capabilities for correlation with the multimodal query intent input value generated from the images within the multimodal user-query input.

15. An information handling system executing computer readable code instructions for an on the box (OTB) artificial intelligence (AI) productivity tool comprising:

a capabilities database memory to store multimodal capability intent values from textual and non-textual descriptions of capabilities of AI productivity tool-enablable software applications executable on the information handling system in a capabilities decision tree with each capability stored under a plurality of branches as a capability node grouped under a branch of the capabilities decision tree according to logical topics in hierarchical parent-child relationships;

a hardware processor executing machine-readable program code instructions to generate a multimodal query input intent value from a multimodal user query input in at least a first portion by execution of code instructions for a text embedding algorithm performed on text or speech converted to text within the multimodal user-query input, where the multimodal user query input requests a response by one of the plurality of AI productivity tool-enableable software applications;

the hardware processor to further generate the multimodal query input intent value from the multimodal user query input in at least a second portion by execution of code instructions for a visual transformer non-textual embedding algorithm performed on an image within the multimodal user-query input;

the hardware processor to perform a cosine semantic similarity search comparing the multimodal capability intent values of a plurality of parent capability nodes in a first level of the capabilities decision tree to the multimodal query intent value to determine a select branch for further semantic similarity comparison;

the hardware processor to identify a best match childless end-of-branch capability node in the select branch of the capabilities decision tree having a highest cosine semantic similarity search score with the multimodal query input intent value; and the hardware processor executing machine-readable program code instructions for a best match capability of the best match childless end-of-branch capability node with a first AI productivity tool-enableable software application in response to the multimodal user query input.

16. The information handling system of claim 15, wherein the cosine semantic similarity search includes a parent score weighted cosine semantic similarity search that generates, for each child capability node, a parent weighted cosine similarity search score that is weighted by the cosine similarity search score determined for the parent capability node of that child capability node.

17. The information handling system of claim 15 further comprising:

the hardware processor executing machine-readable program code instructions of the OTB AI productivity tool to generate the multimodal query intent value from a textual query intent value generated with execution of the text embedding machine learning algorithm representing semantic meaning of a textual or speech input of the multimodal user query input combined with a nontextual query intent value generated with execution of a visual transformer non-textual embedding algorithm representing semantic meaning of the image of the multimodal user query input.

18. The information handling system of claim 15 further comprising:

executing, with the hardware processor, machine-readable program code instructions to store at the capability nodes in the capabilities decision tree the multimodal capability intent values, a natural language text description or non-textual image description of the capability, a capability identification (ID) such as an alphanumeric ID, and metadata identifying a parent capability node of a child capability node.

19. The information handling system of claim 15, wherein the multimodal capability intent values are generated in at least a portion by execution of code instructions for the text embedding algorithm and the multimodal capability intent values mathematically represent semantic meaning for words or phrases within natural language descriptions for the capabilities for correlation with the multimodal query intent input value generated from text or speech converted to text within the multimodal user-query input.

20. The information handling system of claim 15, wherein the multimodal capability intent values are generated in at least a portion by execution of code instructions for the visual transformer non-textual embedding algorithm and the multimodal capability intent values mathematically represent visual meanings for image features within associated images for the capabilities for correlation with the multimodal query intent input value generated from the images within the multimodal user-query input.

* * * * *